(12) United States Patent
Kondo et al.

(10) Patent No.: US 9,422,052 B2
(45) Date of Patent: Aug. 23, 2016

(54) ELECTRO HYDROSTATIC ACTUATOR SYSTEM FOR RETRACTING/EXTENDING LANDING GEAR

(71) Applicant: SUMITOMO PRECISION PRODUCTS CO., LTD., Amagasaki-shi, Hyogo (JP)

(72) Inventors: Taku Kondo, Hyogo (JP); Shogo Hagihara, Hyogo (JP)

(73) Assignee: SUMITOMO PRECISION PRODUCTS CO., LTD., Amagasaki-Shi (JP)

(*) Notice: Subject to any disclaimer, the term of this patent is extended or adjusted under 35 U.S.C. 154(b) by 190 days.

(21) Appl. No.: 14/088,045

(22) Filed: Nov. 22, 2013

(65) Prior Publication Data
US 2014/0151501 A1 Jun. 5, 2014

(30) Foreign Application Priority Data

Dec. 4, 2012 (JP) ................................. 2012-265140
Oct. 21, 2013 (JP) ................................. 2013-218649

(51) Int. Cl.
*B64C 25/22* (2006.01)
*F15B 20/00* (2006.01)
*B64C 25/24* (2006.01)
*B64C 13/50* (2006.01)

(52) U.S. Cl.
CPC ............... *B64C 25/22* (2013.01); *B64C 25/24* (2013.01); *F15B 20/004* (2013.01); *B64C 2013/506* (2013.01); *F15B 2211/20515* (2013.01); *F15B 2211/20538* (2013.01); *F15B 2211/20576* (2013.01); *F15B 2211/7114* (2013.01); *F15B 2211/783* (2013.01); *F15B 2211/8633* (2013.01)

(58) Field of Classification Search
CPC ........ B64C 25/22; B64C 25/10; B64C 25/18; B64C 25/24; F15B 18/00; F15B 20/004; F15B 2211/20576; F15B 11/17; F15B 11/20; F15B 2211/8757
See application file for complete search history.

(56) References Cited

U.S. PATENT DOCUMENTS 3,791,775 A * 2/1974 Bochnak ................. F15B 11/17
                                                           417/426
3,933,176 A * 1/1976 Wheeler ................. F15B 18/00
                                                           137/596

(Continued)

FOREIGN PATENT DOCUMENTS

JP         2009-047237 A        3/2009

*Primary Examiner* — Tien Dinh
*Assistant Examiner* — Alexander V Giczy
(74) *Attorney, Agent, or Firm* — Maschoff Brennan

(57) ABSTRACT

An electro hydrostatic actuator system for retracting/extending a landing gear includes a plurality of hydraulic actuators, a plurality of hydraulic supply sources each including a single hydraulic pump and a single electric motor, provided in parallel to each other and joined at the downstream ends, a plurality of switching valves provided in parallel on a supply path that connects the hydraulic actuators to a junction of the hydraulic supply sources, and a controller configured to sequentially operate the hydraulic actuators. The hydraulic supply sources each include a check valve which prevents operation oil from flowing toward the hydraulic pump. In a normal state, the hydraulic supply sources together supply operation oil sequentially to the hydraulic actuators. When any of the hydraulic supply sources is failed, the other hydraulic supply source(s) other than the failed hydraulic supply source supplies operation oil sequentially to the hydraulic actuators.

6 Claims, 29 Drawing Sheets

(56) References Cited

U.S. PATENT DOCUMENTS

| | | | | |
|---|---|---|---|---|
| 5,284,083 A * | 2/1994 | Vaslin | ..................... | B64C 25/22 60/406 |
| 6,619,037 B1 * | 9/2003 | Toyooka | ............... | E02F 9/2239 60/421 |
| 7,191,593 B1 * | 3/2007 | Ho | ......................... | B64C 13/50 244/78.1 |
| 8,020,379 B2 | 9/2011 | Kakino et al. | | |
| 2003/0033802 A1 * | 2/2003 | Plassmeyer | ............. | F15B 11/16 60/484 |
| 2004/0208754 A1 * | 10/2004 | McFadden | ............ | E02F 9/2239 417/286 |
| 2005/0082427 A1 * | 4/2005 | Seung | ..................... | B64C 25/16 244/102 R |
| 2007/0044463 A1 * | 3/2007 | VerKuilen | ............. | E02F 9/2242 60/420 |
| 2009/0242694 A1 * | 10/2009 | Oyama | .................... | F15B 1/022 244/99.6 |
| 2011/0107756 A1 | 5/2011 | Kondo et al. | | |
| 2011/0154816 A1 * | 6/2011 | Dybing | ............... | F15B 11/0423 60/468 |
| 2011/0290353 A1 * | 12/2011 | Fukui | ...................... | B64C 13/40 137/565.11 |
| 2012/0097792 A1 * | 4/2012 | Ernis | ....................... | B64C 25/22 244/100 R |
| 2012/0233996 A1 * | 9/2012 | Quinnell | ............... | E02F 9/2235 60/421 |
| 2014/0366522 A1 * | 12/2014 | Masutani | ................ | F15B 15/18 60/477 |

* cited by examiner

FIG.10

RETRACTION OF LANDING GEAR

| STATE | NORMAL STATE | | | FAILURE STATE | | |
|---|---|---|---|---|---|---|
| CAPACITY | 50% | | | 50% | | |
| THE NUMBER OF HYDRAULIC SUPPLY SOURCES | 2 | | | 1 | | |
| MAXIMUM ROTATIONAL SPEED | 13736rpm | | | | | |
| | OPERATION TIME | SET ROTATIONAL SPEED | | OPERATION TIME | SET ROTATIONAL SPEED | |
| | sec | rpm | | sec | rpm | |
| OPERATION OF OPENING DOOR | 2.00 | 5344 | | 2.00 | 10689 | |
| OPERATION OF LIFTING LANDING GEAR | 9.00 | 9897 | | 12.16 | 13736 | |
| OPERATION OF CLOSING DOOR | 2.00 | 13736 | | 3.29 | 13736 | |
| TOTAL | 13.00 | – | | 17.45 | – | |
| RATIO | – | – | | 1.34 | – | |

EXTENSION OF LANDING GEAR

| STATE | NORMAL STATE | | | FAILURE STATE | | |
|---|---|---|---|---|---|---|
| CAPACITY | 50% | | | 50% | | |
| THE NUMBER OF HYDRAULIC SUPPLY SOURCES | 2 | | | 1 | | |
| MAXIMUM ROTATIONAL SPEED | 13736rpm | | | | | |
| | OPERATION TIME | SET ROTATIONAL SPEED | | OPERATION TIME | SET ROTATIONAL SPEED | |
| | sec | rpm | | sec | rpm | |
| OPERATION OF OPENING DOOR | 2.00 | 5344 | | 2.00 | 10689 | |
| OPERATION OF LOWERING LANDING GEAR | 12.00 | 4737 | | 12.00 | 9473 | |
| OPERATION OF CLOSING DOOR | 2.00 | 13736 | | 3.29 | 13736 | |
| TOTAL | 16.00 | – | | 17.29 | – | |
| RATIO | – | – | | 1.08 | – | |

ELECTRO HYDROSTATIC ACTUATOR SYSTEM FOR RETRACTING/EXTENDING LANDING GEAR

CROSS-REFERENCE TO RELATED APPLICATION

This application claims priority to Japanese Patent Application No. 2012-265140 filed on Dec. 4, 2012 and Japanese Patent Application No. 2013-218649 filed on Oct. 21, 2013, the entire disclosure of which is incorporated by reference herein.

BACKGROUND

A technique disclosed herein relates to an electro hydrostatic actuator (EHA) system for retracting/extending a landing gear of an aircraft.

In recent years, hydraulic supply systems have no longer been mounted in conventional aircrafts, considering improvement of fuel efficiency of aircrafts, maintainability of aircrafts, etc. It has been proposed that EHA systems are mounted as actuators for, e.g., retraction/extension of landing gears, a control surface operation, a braking operation, and a landing gear steering operation (see, e.g., US Patent Publication No. 2011/0107756). The EHA system includes a hydraulic actuator, a hydraulic pump, and an electric motor. The electric motor drives the hydraulic pump to operate the hydraulic actuator. For example, in a mechanism for retracting/extending a landing gear, each of the following actuators may be employed for the EHA system: a gear actuator for lifting/lowering the landing gear; a door actuator for opening/closing a door of a landing gear bay in which the landing gear is stored; and a down-lock release actuator for releasing a mechanism for maintaining a landing gear down state.

The EHA system described in US Patent Publication No. 2011/0107756 includes, for a single hydraulic actuator, a hydraulic supply source having a single hydraulic pump and a single electric motor. As described above, the landing gear retraction/extension mechanism includes at least three types of hydraulic actuators, i.e., the gear actuator, the door actuator, and the down-lock release actuator. Thus, the hydraulic supply source is required for each of the three types of hydraulic actuators. For such a reason, since the EHA system of the landing gear retraction/extension mechanism includes at least three hydraulic pumps and three electric motors, there are disadvantages such as expansion of space occupied by the EHA system and an increase in weight of the EHA system.

Considering the foregoing disadvantages, e.g., Japanese Unexamined Patent Publication No. 2009-047237 describes an EHA system in which a single hydraulic supply source supplies hydraulic pressure to two actuators, i.e., a gear actuator and a down-lock release actuator, operated in synchronization with each other in the operation of retracting a landing gear.

SUMMARY

Unlike a landing gear retraction/extension mechanism using an electro-mechanical actuator (EMA) system, a landing gear retraction/extension mechanism using an EHA system has an advantage that hydraulic pressure is, in emergency situations, released to lower a landing gear under its own weight. Meanwhile, there is a technical disadvantage that redundancy should be ensured only by the EHA system instead of a conventional aircraft hydraulic supply system with double or triple redundancy. In order to overcome such a disadvantage, redundancy may be ensured in such a manner that a hydraulic supply source for supplying operation oil to a hydraulic actuator is provided with a plurality of hydraulic pumps and a plurality of electric motors. However, while the redundancy for each hydraulic supply source is ensured, many hydraulic pumps and many electric motors are, as described above, required for a landing gear retraction/extension mechanism including a plurality of hydraulic actuators. This results in further expansion of space occupied by the EHA system and a significant increase in weight of the EHA system.

The technique disclosed herein has been made in view of the foregoing, and aims to ensure, in an EHA system for retracting/extending a landing gear of an aircraft, the redundancy of a hydraulic supply source with the minimum possible space occupied by the EHA system and reduction in weight of the EHA system.

The present inventors have focused on a gear actuator, a door actuator, and a down-lock release actuator of a landing gear retraction/extension mechanism of an aircraft which are not operated simultaneously but operated sequentially in retraction/extension of a landing gear. A single hydraulic supply source does not supply operation oil only to a single hydraulic actuator, but supplies operation oil to each hydraulic actuator of the landing gear retraction/extension mechanism. In order to ensure redundancy of the hydraulic supply source, a plurality of hydraulic supply sources each configured to supply operation oil to each hydraulic actuator are provided. According to such a configuration, the redundancy of the hydraulic supply source can be ensured. Moreover, such a configuration is advantageous to reduction in size and weight of an EHA system for retracting/extending a landing gear.

The present inventors have further found as follows. When all of a plurality of hydraulic supply sources are normally operated, if one of the hydraulic supply sources supplies operation oil to each hydraulic actuator, a supply capacity of each hydraulic supply source should be set at a relatively-high level. The hydraulic supply source having a high supply capacity is large and heavy. Thus, if the supply capacity of each hydraulic supply source is increased, the size and weight of an entire EHA system for retracting/extending a landing gear are increased. For such a reason, the present inventors have developed the configuration of the present disclosure as follows. When all of the hydraulic supply sources are normally operated, the hydraulic supply sources together supply operation oil sequentially to the hydraulic actuators. On the other hand, when one or some of the hydraulic supply sources are failed, the other hydraulic supply source(s) other than the failed hydraulic supply source(s) supplies operation oil sequentially to the hydraulic actuators. As will be described later, such a configuration may be advantageous to further reduction in size and weight of the EHA system for retracting/extending the landing gear.

The technique disclosed herein relates to an electro hydrostatic actuator system for retracting/extending a landing gear of an aircraft.

The EHA system includes a plurality of hydraulic actuators configured to sequentially receive, for operation thereof, a supply of operation oil in retraction or extension of the landing gear; and a plurality of hydraulic supply sources provided in parallel to each other such that the operation oil is supplied to each hydraulic actuator. Each hydraulic supply source includes a single hydraulic pump configured to discharge the operation oil, and a single electric motor configured to drive the hydraulic pump.

The hydraulic supply sources together supply the operation oil sequentially to the hydraulic actuators in a normal state of the hydraulic supply sources. When at least one of the hydraulic supply sources is failed, at least one hydraulic supply source other than the failed one of the hydraulic supply sources supplies the operation oil sequentially to the hydraulic actuators.

BRIEF DESCRIPTION OF THE DRAWINGS

FIG. 10 is a table illustrating an example of a change in operation oil supply capacity in a normal state and a failure state of an hydraulic supply source.

DETAILED DESCRIPTION

Figure 1:
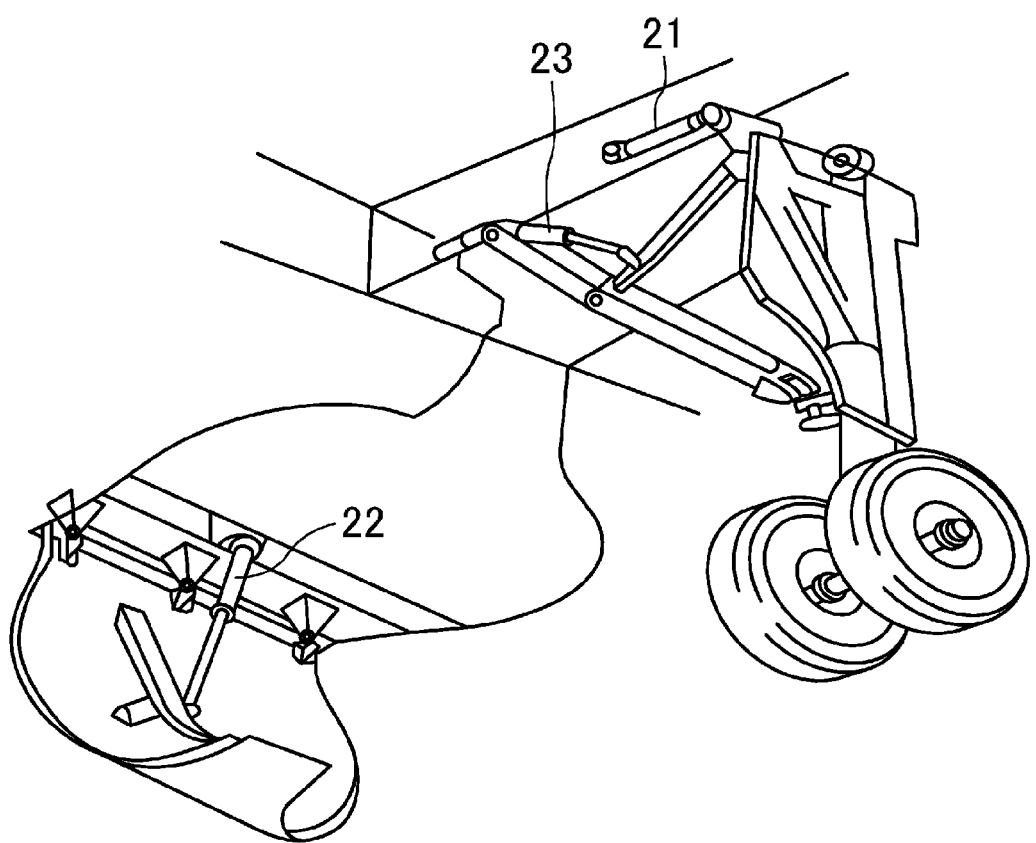
FIG. 1 is a perspective view illustrating an example of a landing gear retraction/extension mechanism for which an EHA system is applied.

The technique disclosed herein relates to an electro hydrostatic actuator system for retracting/extending a landing gear of an aircraft.

The EHA system includes a plurality of hydraulic actuators configured to sequentially receive, for operation thereof, a supply of operation oil in retraction or extension of the landing gear; and a plurality of hydraulic supply sources provided in parallel to each other such that the operation oil is supplied to each hydraulic actuator. Each hydraulic supply source includes a single hydraulic pump configured to discharge the operation oil, and a single electric motor configured to drive the hydraulic pump.

The hydraulic supply sources together supply the operation oil sequentially to the hydraulic actuators in a normal state of the hydraulic supply sources. When at least one of the hydraulic supply sources is failed, at least one hydraulic supply source other than the failed one of the hydraulic supply sources supplies the operation oil sequentially to the hydraulic actuators.

The "plurality of hydraulic actuators" may include at least two or three of a gear actuator configured to lift/lower a landing gear, a door actuator configured to open/close a door of a landing gear bay in which the landing gear is stored, and a down-lock release actuator configured to release a mechanism for maintaining a landing gear down state. Note that the EHA system may include four or more hydraulic actuators.

Moreover, each hydraulic actuator is not always operated once in retraction/extension of the landing gear, and may be operated several times. For example, in each of retraction and extension of the landing gear, the door actuator configured to open/close the door is operated two times to open the door and close the opened door.

According to the foregoing configuration, each hydraulic supply source does not supply operation oil only to a single hydraulic actuator, but supplies operation oil to a plurality of hydraulic actuators. Such a configuration allows the number of hydraulic supply sources to be equal to or less than the number of hydraulic actuators in the landing gear retraction/extension mechanism.

The hydraulic supply sources are arranged in parallel to each other. Thus, even if any of the hydraulic supply sources is failed, the other hydraulic supply source(s) is capable of supplying operation oil to each hydraulic actuator. That is, redundancy of the hydraulic supply source can be realized. Such redundancy can be realized by the hydraulic supply sources, the number of which is equal to or less than the number of hydraulic actuators of the landing gear retraction/extension mechanism. Thus, the redundancy of the hydraulic supply source can be ensured, as well as reducing space occupied by the EHA system for retracting/extending the landing gear. Moreover, the weight of the EHA system can be reduced.

When any of the hydraulic supply sources is failed, the other hydraulic supply source(s) supplies operation oil sequentially to the hydraulic actuators. For example, when one of two hydraulic supply sources is failed, the other hydraulic supply source supplies operation oil sequentially to the hydraulic actuators.

On the other hand, when the hydraulic supply sources are normally operated, the hydraulic supply sources together supply operation oil sequentially to the hydraulic actuators. An operation oil supply capacity required for the hydraulic supply source is set such that operation oil supply conditions required for operation of the hydraulic actuator, specifically the flow rate and pressure of operation oil to be supplied, are satisfied. According to the foregoing configuration, since the hydraulic supply sources together supply operation oil, the operation oil supply capacity required for each hydraulic supply source can be set at a relatively-low level. This is advantageous to reduction in size and weight of each hydraulic supply source. Furthermore, the space occupied by the EHA system for retracting/extending the landing gear is further reduced, and the weight of the EHA system is further reduced.

The hydraulic actuators may be different from each other in operation oil supply conditions required for the operation of the hydraulic actuators, and an operation oil supply capacity of each hydraulic supply source required for sequentially operating the hydraulic actuators to retract or extend the landing gear may be set based on the supply conditions. A supply capacity of each hydraulic supply source may be set so as to be lower than the required supply capacity of each hydraulic supply source. In the normal state of the hydraulic supply sources, the hydraulic pump of each hydraulic supply source may be driven at a predetermined rotational speed to supply the operation oil sequentially to the hydraulic actuators. When at least one of the hydraulic supply sources is failed, at least one hydraulic supply source other than the failed one of the hydraulic supply sources may be driven at a rotational speed higher than the predetermined rotational speed.

According to the foregoing configuration, the hydraulic actuators are different from each other in the operation oil supply conditions required for operation thereof. In addition to the difference in supply conditions among the hydraulic actuators, supply conditions for a single hydraulic actuator may be different from each other depending on operations (e.g., different between the operation of extending an extendable linear hydraulic actuator and the operation of retracting the extendable linear hydraulic actuator). The different operation oil supply conditions mean that there are the strictest operation oil supply condition(s) and milder operation oil supply conditions. The hydraulic actuators are sequentially operated in retraction/extension of the landing gear. Thus, if the operation oil supply capacity required for retracting/extending the landing gear satisfies the strictest supply condition(s), the milder supply conditions can be satisfied.

As described above, in the actuator system having the foregoing configuration, the hydraulic supply sources supply operation oil to the hydraulic actuators in the normal state. Since the hydraulic supply sources together supply operation oil, the required supply capacity can be ensured by cooperation of the hydraulic supply sources even if the supply capacity of each hydraulic supply source is set so as to be lower than the required supply capacity. Suppose that two hydraulic supply sources are provided. When a supply capacity satisfying the strictest operation oil supply condition(s) is 100%, a supply capacity of each hydraulic supply source may be set at 50% or more. Thus, the hydraulic supply sources are driven with the maximum capacity (e.g., each electric motor of the hydraulic supply sources is driven at the maximum rotational speed) to drive the hydraulic pump at the maximum rotational speed, thereby satisfying the strictest operation oil supply condition(s).

When the operation oil supply conditions for the hydraulic actuators are milder than the strictest supply condition(s), the supply conditions can be satisfied even if each hydraulic supply source is driven with a supply capacity lower than the maximum capacity (e.g., the electric motor is driven at a rotational speed lower than the maximum rotational speed to drive the hydraulic pump at a rotational speed lower than the maximum rotational speed).

As described above, even if the supply capacity of each hydraulic supply source is set at a relatively-low level, all of the required operation oil supply conditions can be satisfied in the normal state of the hydraulic supply source, and it can be ensured that the landing gear is retracted/extended. Moreover, the setting of the supply capacity of each hydraulic supply source at a relatively-low level is advantageous to reduction in size and weight of the hydraulic supply source, and therefore is advantageous to reduction in size and weight of the EHA system for retracting/extending the landing gear.

When the supply capacity of each hydraulic supply source is set at a relatively-low level, if any of the hydraulic supply sources is failed and the number of hydraulic supply sources is substantially reduced, the operation oil supply capacity may be reduced as compared to that in the normal state. For such a reason, the strictest supply condition(s) may not be satisfied.

However, when the operation oil supply conditions for the hydraulic actuators are relatively mild, even if each hydraulic supply source is driven with the supply capacity lower than the maximum capacity, the supply conditions can be satisfied as described above. Thus, the supply conditions may be satisfied in such a manner that the remaining hydraulic supply source(s) is driven with a capacity higher than that in the normal state (e.g., the electric motor is driven at the maximum rotational speed to drive the hydraulic pump at the maximum rotational speed). That is, even when any of the hydraulic supply sources is failed and, accordingly, the number of hydraulic supply sources is substantially reduced, the supply conditions milder than the strictest supply condition(s) may be satisfied. As a result, even in failure of the hydraulic supply source, the EHA system for retracting/extending the landing gear is capable of retracting/extending the landing gear with almost no degradation of operation oil supply performance.

The hydraulic supply sources may include first and second hydraulic supply sources, and the first and second hydraulic supply sources may have an identical operation oil supply capacity.

According to the foregoing configuration, even when one of the first and second hydraulic supply sources is failed, the degree of capacity reduction is the same between the case where the first hydraulic supply source is failed and the case where the second hydraulic supply source is failed.

The hydraulic supply sources provided in parallel to each other each may include a check valve arranged downstream of the hydraulic pump.

As described above, when any of the hydraulic supply sources is failed, the failed hydraulic supply source is stopped, and the other hydraulic supply source(s) supplies operation oil to the hydraulic actuators. Since the hydraulic supply sources are arranged in parallel to each other, operation oil discharged from the other hydraulic supply source(s) may flows back to the failed hydraulic supply source. The check valve prevents a backflow of operation oil when any of the hydraulic supply sources is failed, thereby stabilizing an operation oil supply.

Embodiments of an EHA system for retracting/extending a landing gear of an aircraft will be described below with reference to drawings. The EHA system described herein will be set forth as an example. FIG. 1 illustrates an example of a landing gear retraction/extension mechanism for which the EHA system is employed. The landing gear retraction/extension mechanism for allowing a landing gear to be stored in an aircraft body or to extend from the aircraft body includes three types of actuators, i.e., a gear actuator 21 configured to lift/lower the landing gear, a door actuator 22 configured to open/close a door of a landing gear bay in which the landing gear is stored, and a down-lock release actuator 23 configured to release a mechanism for maintaining a landing gear down state. Although details will be described later, the three types of actuators are sequentially operated to retract/extend the landing gear.

First Embodiment

Figure 2:
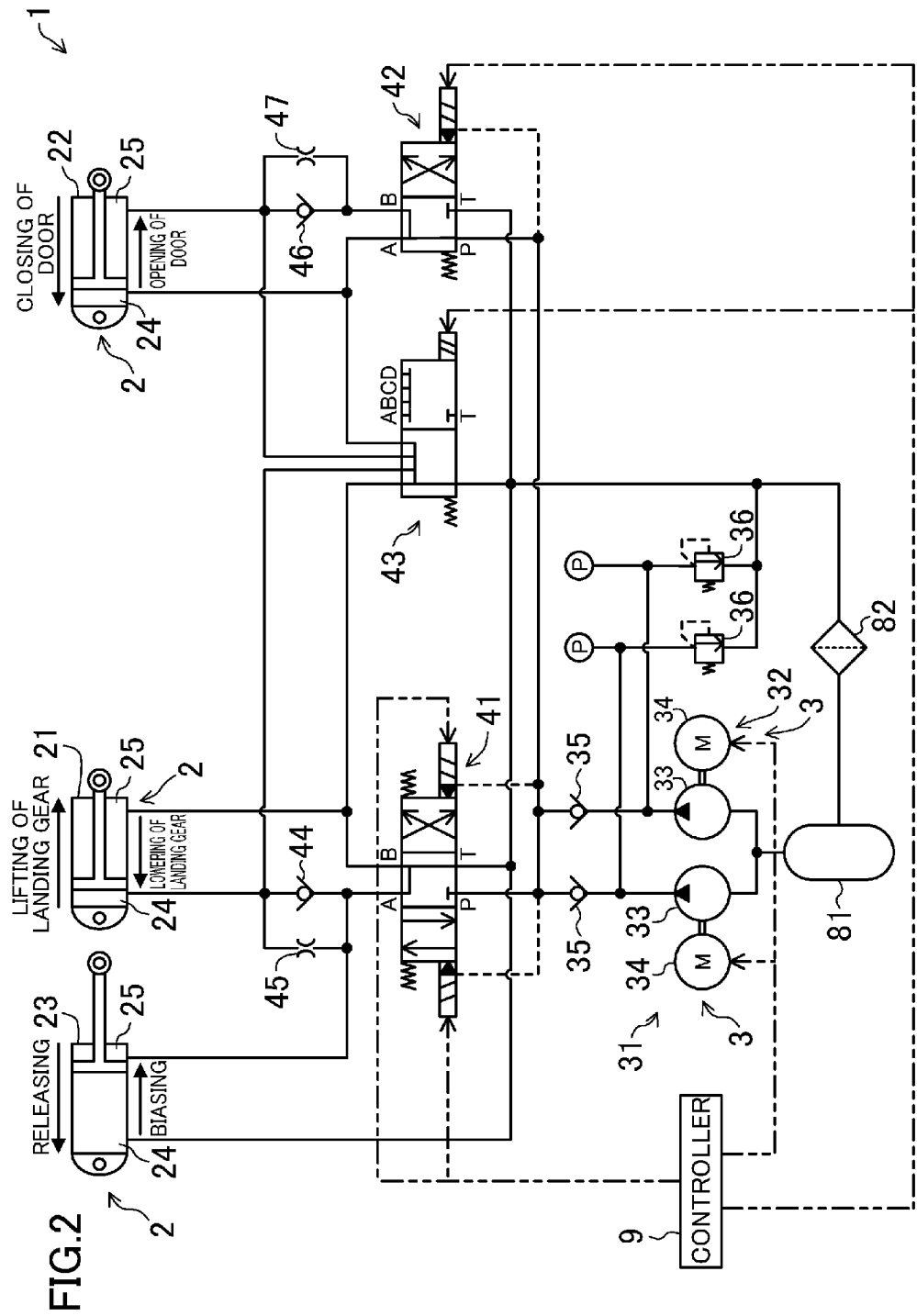
FIG. 2 is a circuit diagram of a landing gear retraction/extension EHA system of a first embodiment illustrating a landing gear down state (i.e., a landing-gear-lowered and door-closed state).

FIG. 2 is a circuit diagram of an EHA system 1 of a first embodiment. The EHA system 1 includes a gear actuator 21, a door actuator 22, and a down-lock release actuator 23. All of the actuators 21, 22, 23 are extendable linear hydraulic cylinder/piston type actuators extended and refracted by a supply of operation oil. The gear actuator 21, the door actuator 22, and the down-lock release actuator 23 are hereinafter sometimes collectively referred to as a "hydraulic actuator 2." In FIG. 2, an operation oil path is indicated by a solid line, a pilot hydraulic path is indicated by a dashed line, and an electric signal path is indicated by a chain double-dashed line.

A bore oil chamber 24 and an annulus oil chamber 25 are formed in the cylinder of the hydraulic actuator 2. A piston head divides the inside of the cylinder into the bore oil chamber 24 and the annulus oil chamber 25. A first port of the hydraulic actuator 2 communicates with the bore oil chamber 24, and a second port of the hydraulic actuator 2 communicates with the annulus oil chamber 25. Operation oil flows into the bore oil chamber 24 or flows out from the bore oil chamber 24 through the first port, and flows into the annulus oil chamber 25 or flows out from the annulus oil chamber 25 through the second port.

The gear actuator 21 is configured such that a landing gear is lifted against a load while the gear actuator 21 is being extended and that the load is released to lower the landing gear while the gear actuator 21 is being retracted. The door actuator 22 is configured such that a load is released to open a door while the door actuator 22 is being extended and that the door is closed against the load while the door actuator 22 is being retracted. The down-lock release actuator 23 is configured such that a biasing member which is not shown in the figure provides a load while the down-lock release actuator 23 is being extended, and is also configured to be retracted to release a mechanism for maintaining a landing gear down state. Although not clearly illustrated in the figure, the gear actuator 21, the door actuator 22, and the down-lock release actuator 23 are different from each other in bore diameter and stroke. The bore diameter of the hydraulic actuator 2 is set depending on a load acting on the hydraulic actuator 2, and the stroke of the hydraulic actuator 2 is set depending on structures of the landing gear and the door which are operated by the hydraulic actuator 2. Depending on the bore diameter and stroke of the hydraulic actuator 2, a time elapsed from start to finish of a sequence of steps of retracting the landing gear, and a time elapsed from start to finish of a sequence of steps of extending the landing gear, operation oil supply conditions (i.e., the flow rate and pressure of operation oil to be supplied) required for each operation of the gear actuator 21, the door actuator 22, and the down-lock release actuator 23 in retraction/extension of the landing gear are determined. Such operation oil supply conditions relate to specifications of a hydraulic pump 33 and an electric motor 34 of a hydraulic supply source 3 which will be described later.

The EHA system 1 includes first and second hydraulic supply sources 31, 32 configured to supply operation oil to each actuator 2. The first and second hydraulic supply sources 31, 32 are arranged in parallel to each other on a circuit. Note that the first and second hydraulic supply sources 31, 32 are hereinafter sometimes collectively referred to as a "hydraulic supply source 3."

The hydraulic supply source 3 includes a single hydraulic pump 33 and a single electric motor 34 which are drive-connected together. For example, the hydraulic pump 33 and the electric motor 34 are directly connected together. In such a configuration, the rotational speed of the hydraulic pump 33 and the rotational speed of the electric motor 34 are substantially identical to each other. In the present embodiment, the hydraulic pump 33 is a one-direction rotary pump which is rotatable only in one direction and which is configured to take operation oil through an inlet port and discharge the operation oil through an outlet port. The hydraulic pump 33 may be a swash plate-type piston pump. Note that the type of the hydraulic pump 33 is not limited to the foregoing. The electric motor 34 is, e.g., a three-phase motor, and is configured to receive power supplied from a not-shown power source to drive the hydraulic pump 33. The electric motor 34 is driven or stopped by a controller 9 which will be described later.

Each of the first and second hydraulic supply sources 31, 32 includes a check valve 35 arranged downstream (i.e., an outlet port side) of the hydraulic pump 33. Although will be described in detail later, when one of the first and second hydraulic supply sources 31, 32 is stopped due to failure thereof, the check valve 35 prevents operation oil discharged by the hydraulic pump 33 of the other one of the first and second hydraulic supply sources 31, 32 from flowing back to the stopped hydraulic supply source 3.

The first and second hydraulic supply sources 31, 32 arranged in parallel to each other are joined together at upstream ends thereof so as to be connected to a reservoir 81. The reservoir 81 is a tank configured to absorb a change in total volume of the bore oil chamber 24 and the annulus oil chamber 25 of the hydraulic actuator 2 due to extension/retraction of the hydraulic actuator 2. The first and second hydraulic supply sources 31, 32 are joined together at downstream ends thereof so as to be connected to a gear selector valve 41 and a door selector valve 42 which will be described later. Each of the first and second hydraulic supply sources 31, 32 is branched downstream of the hydraulic pump 33, and such a branched line is connected to the reservoir 81 through a relief valve 36 and a filter 82.

The gear selector valve 41 is a four-port three-position switching valve formed with four ports, i.e., a P port, a T port, an A port, and a B port. The gear selector valve 41 has a function to selectively supply operation oil to the gear actuator 21 and the down-lock release actuator 23. The P port of the gear selector valve 41 is connected to each of the outlet ports of the hydraulic pumps 33 of the first and second hydraulic supply sources 31, 32. The T port of the gear selector valve 41 is connected to the reservoir 81. The A port of the gear selector valve 41 is connected to the bore oil chamber 24 of the gear actuator 21 and the annulus oil chamber 25 of the down-lock release actuator 23. The B port of the gear selector valve 41 is connected to the annulus oil chamber 25 of the gear actuator 21. Note that the bore oil chamber 24 of the down-lock release actuator 23 is connected to the reservoir 81.

The gear selector valve 41 is also a hydraulic pilot type solenoid valve. A spool driven by pilot hydraulic pressure is biased to a center position by a spring. At the center position, the gear selector valve 41 allows each of the A and B ports to communicate with the T port. Moreover, at a first offset position (i.e., a position on the left side as viewed in FIG. 2), the gear selector valve 41 allows the A and P ports to communicate with each other, and allows the B and T ports to communicate with each other. At a second offset position (i.e., a position on the right side as viewed in FIG. 2), the gear selector valve 41 allows the A and T ports to communicate with each other, and allows the B and P ports to communicate with each other. Although will be described in detail later, the controller 9 switches the gear selector valve 41 to selectively supply operation oil to the bore oil chamber 24 or the annulus oil chamber 25 of the gear actuator 21 and to switch between the state in which operation oil is supplied to the annulus oil chamber 25 of the down-lock release actuator 23 and the state in which an operation oil supply to the annulus oil chamber 25 of the down-lock release actuator 23 is stopped.

A check valve 44 and an orifice 45 positioned in parallel to each other are interposed between the A port of the gear selector valve 41 and the bore oil chamber 24 of the gear actuator 21. Although will be described in detail later, the check valve 44 and the orifice 45 control the speed of retraction of the gear actuator 21.

The door selector valve 42 is a four-port two-position switching valve formed with four ports, i.e., a P port, a T port, an A port, and a B port. The door selector valve 42 has a function to selectively supply operation oil to the door actuator 22. The P port of the door selector valve 42 is connected to each of the outlet ports of the hydraulic pumps 33 of the first and second hydraulic supply sources 31, 32. The T port of the door selector valve 42 is connected to the reservoir 81. The A port of the door selector valve 42 is connected to the bore oil chamber 24 of the door actuator 22. The B port of the door selector valve 42 is connected to the annulus oil chamber 25 of the door actuator 22.

The door selector valve 42 is also a hydraulic pilot type solenoid valve. A spool driven by pilot hydraulic pressure is biased to a normal position by a spring. At the normal position, the door selector valve 42 allows each of the A and B ports to communicate with the P port. At an offset position, the door selector valve 42 allows the A and T ports to communicate with each other, and allows the B and P ports to communicate with each other. Although will be described in detail later, the controller 9 switches the door selector valve 42 to selectively supply operation oil to the bore oil chamber 24 or the annulus oil chamber 25 of the door actuator 22.

A check valve 46 and an orifice 47 positioned in parallel to each other are interposed between the B port of the door selector valve 42 and the annulus oil chamber 25 of the door actuator 22. The check valve 46 and the orifice 47 control the speed of extension of the door actuator 22.

A dump valve 43 is interposed between each of the gear actuator 21 and the door actuator 22 and the reservoir 81. The dump valve 43 is a five-port two-position switching valve formed with an A port, a B port, a C port, a D port, and a T port. The A port of the dump valve 43 is connected to the annulus oil chamber 25 of the gear actuator 21. The B port of the dump valve 43 is connected to the bore oil chamber 24 of the gear actuator 21. The C port of the dump valve 43 is connected to the annulus oil chamber 25 of the door actuator 22. The D port of the dump valve 43 is connected to the bore oil chamber 24 of the door actuator 22. The T port of the dump valve 43 is connected to the reservoir 81.

The dump valve 43 is a solenoid valve including a spool directly driven by a solenoid. The spool of the dump valve 43 is biased to a normal position by a spring. At the normal position, the dump valve 43 allows all of the A, B, C, and D ports to communicate with the T port. At an offset position, the dump valve 43 blocks all of the A, B, C, D, and T ports. The controller 9 switches the dump valve 43.

Next, steps of operation of the EHA system 1 for retracting the landing gear will be described with reference to FIGS. 2-6. When a sensor(s) and a switch(es) which are not shown in the figure detect operation of each hydraulic actuator 2 and/or operation of the door or the landing gear, the controller 9 drives or stops the electric motors 34 of the first and second hydraulic supply sources 31, 32, and switches the gear selector valve 41, the door selector valve 42, and the dump valve 43. This brings about a landing-gear-lifted and door-closed state illustrated in FIG. 6 through the operation of opening the door (FIG. 3), the operation of lifting the landing gear (FIG. 4), and the operation of closing the door (FIG. 5) which are performed in this order, starting from a landing-gear-lowered and door-closed state illustrated in FIG. 2. In FIGS. 3-6, a path through which operation oil is supplied is indicated by a thick solid line, the pilot hydraulic path is indicated by a dashed line, and a path connected to the reservoir 81 is indicated by a solid line. Moreover, the controller 9, the electric motors 34, and the electric signal path are not shown in FIGS. 3-6.

At the beginning of retraction of the landing gear, the EHA system 1 is in the state illustrated in FIG. 2. That is, the gear selector valve 41 is at the center position, and the door selector valve 42 and the dump valve 43 are at the normal position. Starting from such a state, the controller 9 switches, referring to FIG. 3, the dump valve 43 to the offset position, thereby blocking all of the A-D and T ports.

Figure 3:
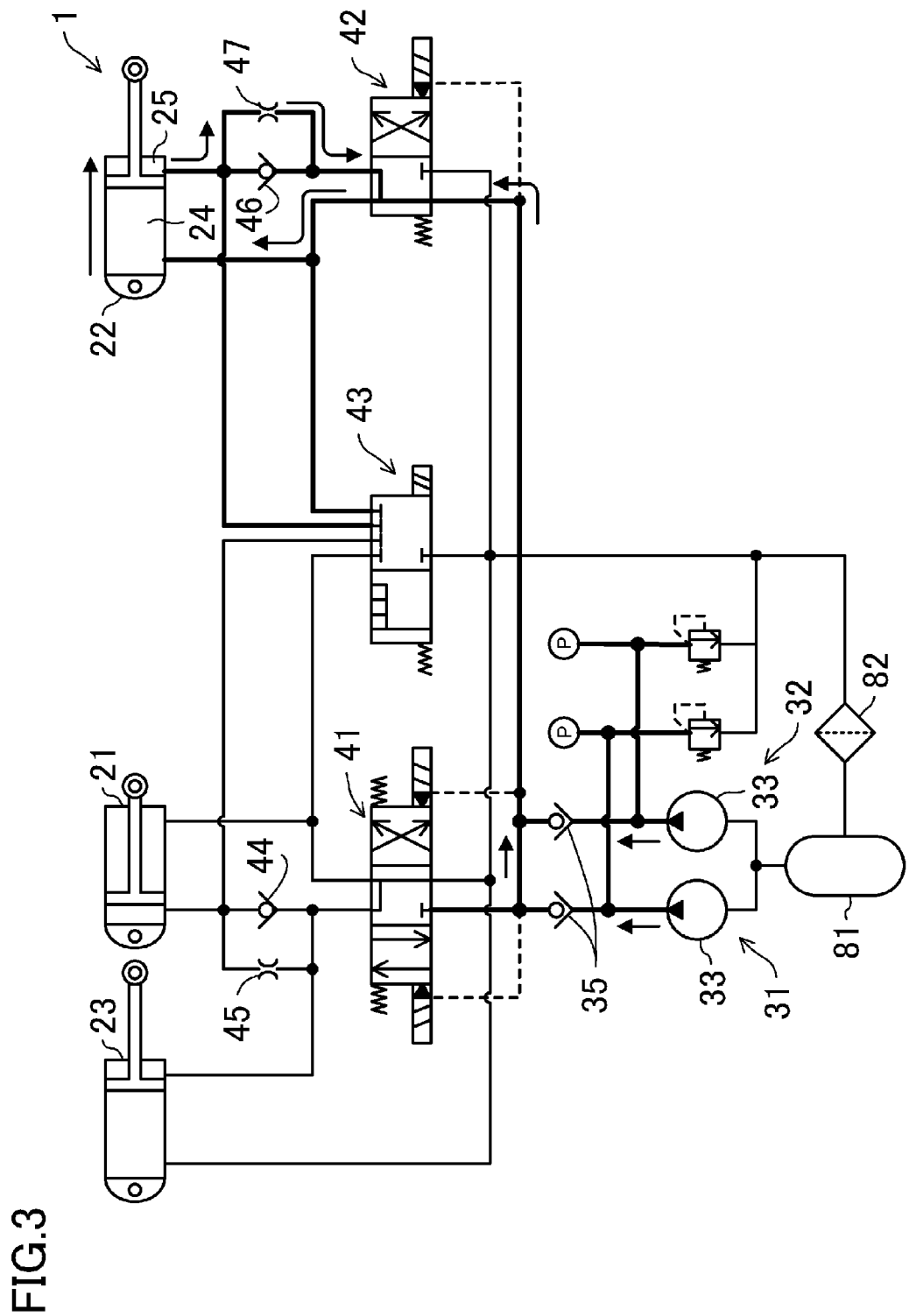
FIG. 3 is a diagram illustrating, upon retraction of the landing gear, an EHA system operation from the landing-gear-lowered and door-closed state to a door-opened state.

The controller 9 drives the electric motors 34 of the first and second hydraulic supply sources 31, 32. Referring to FIG. 3, operation oil flows into the bore oil chamber 24 of the door actuator 22, thereby extending the door actuator 22 (see an arrow illustrated in FIG. 3). Operation oil discharged from the annulus oil chamber 25 while the door actuator 22 is being extended flows into the bore oil chamber 24 of the door actuator 22 through the orifice 47 and the door selector valve 42. Since operation oil is supplied from the annulus oil chamber 25 to the bore oil chamber 24, the door actuator 22 is extended even with a small discharge amount of each hydraulic pump 33. The door actuator 22 is extended to open the door of the landing gear bay.

Figure 4:
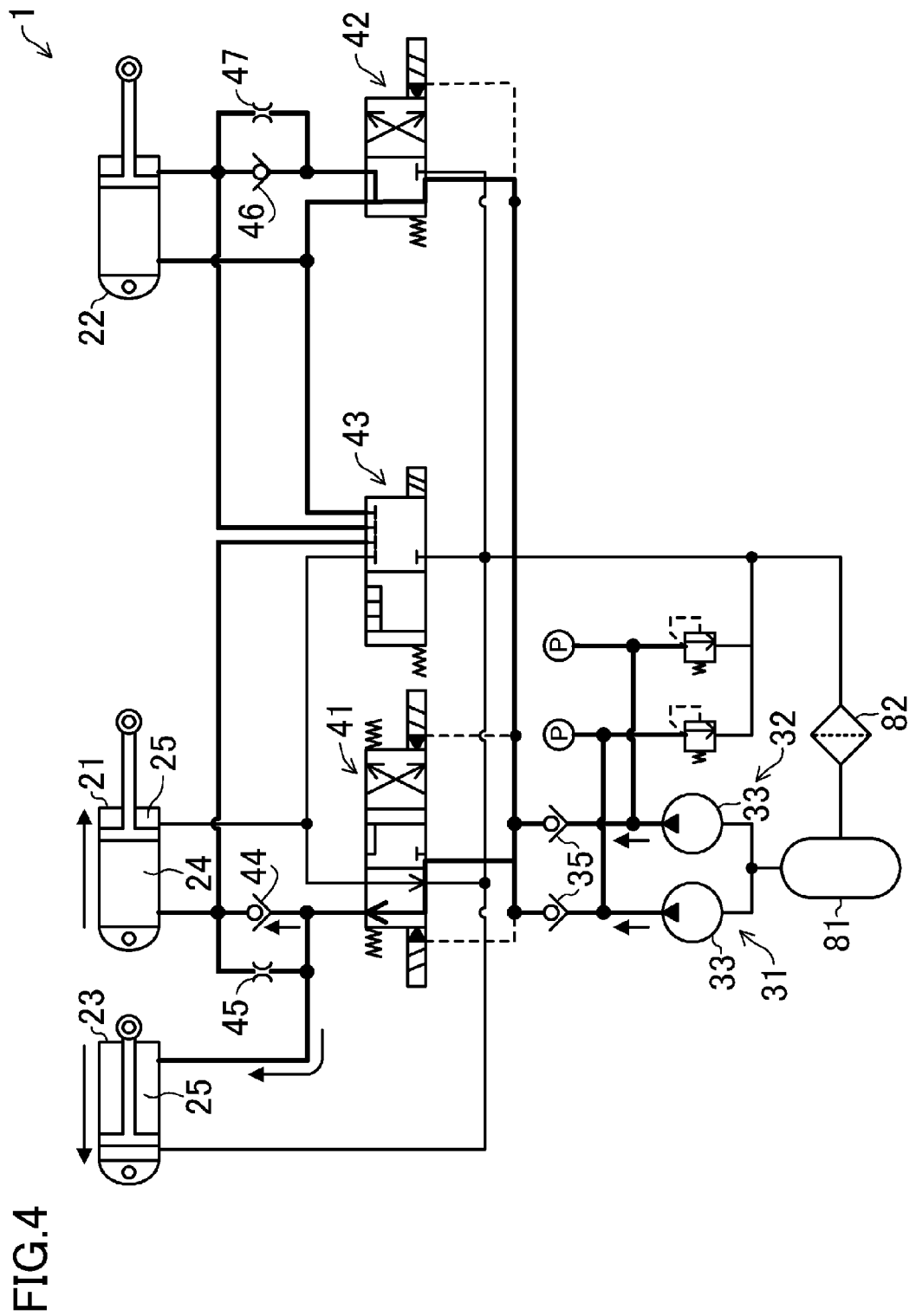
FIG. 4 is a diagram illustrating, upon the retraction of the landing gear, an EHA system operation from the landing-gear-lowered and door-opened state to a landing-gear-lifted state.

After the door of the landing gear bay is opened, the controller 9 switches, referring to FIG. 4, the gear selector valve 41 to the first offset position. This allows the A and P ports of the gear selector valve 41 to communicate with each other, and allows the B and T ports of the gear selector valve 41 to communicate with each other. As indicated by arrows, the first and second hydraulic supply sources 31, 32 supply operation oil to the annulus oil chamber 25 of the down-lock release actuator 23 through the gear selector valve 41. The down-lock release actuator 23 is retracted as indicated by an arrow illustrated in FIG. 4, thereby releasing the mechanism for maintaining the landing gear down state. Moreover, the first and second hydraulic supply sources 31, 32 supply operation oil to the bore oil chamber 24 of the gear actuator 21 through the check valve 44. The gear actuator 21 is extended as indicated by an arrow illustrated in FIG. 4, thereby lifting the landing gear which is not shown in the figure. Operation oil discharged from the annulus oil chamber 25 while the gear actuator 21 is being extended returns to the reservoir 81 through the gear selector valve 41 and the filter 82.

Figure 5:
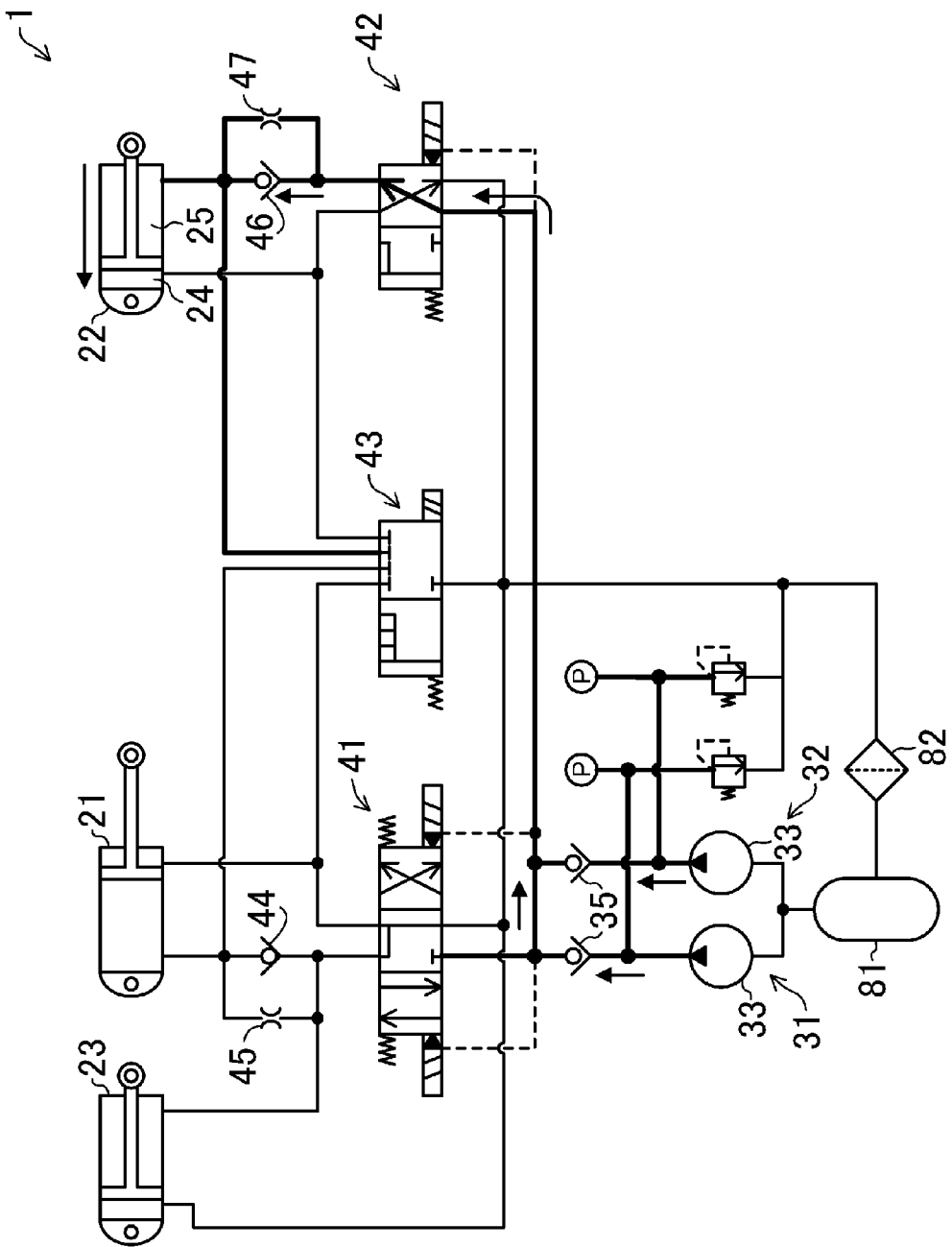
FIG. 5 is a diagram illustrating, upon the retraction of the landing gear, an EHA system operation from the landing-gear-lifted and door-opened state to a door-closed state.

After the landing gear is stored in the landing gear bay, the controller 9 switches, referring to FIG. 5, the gear selector valve 41 to the center position, and switches the door selector valve 42 to the offset position. The first and second hydraulic supply sources 31, 32 supply operation oil to the annulus oil chamber 25 of the door actuator 22. The door actuator 22 is retracted as indicated by an arrow illustrated in FIG. 5. Operation oil discharged from the bore oil chamber 24 while the door actuator 22 is being retracted returns to the reservoir 81 through the door selector valve 42 and the filter 82. The door is closed. As described above, a sequence of operation of retracting the landing gear is completed. After completion of retraction of the landing gear, the controller 9 switches, in order to maintain the state illustrated in FIG. 6, i.e., the landing-gear-lifted and door-closed state, the door selector valve 42 to the normal position, and stops the electric motors 34 of the first and second hydraulic supply sources 31, 32. Moreover, the controller 9 switches the dump valve 43 to the normal position.

Next, steps of operation of the EHA system 1 for extending the landing gear will be described with reference to FIGS. 6-9. As in FIGS. 3-6, the path through which operation oil is supplied is, in FIGS. 7-9, indicated by a thick solid line, the pilot hydraulic path is indicated by a dashed line, and the path connected to the reservoir 81 is indicated by a solid line. Moreover, the controller 9, the electric motors 34, and the electric signal path are not shown in FIGS. 7-9. In lowering of the landing gear, when the sensor(s) and the switch(es) which are not shown in the figure detect operation of each hydraulic actuator 2 and/or operation of the door or the landing gear, the controller 9 drives or stops the electric motors 34 of the first and second hydraulic supply sources 31, 32, and switches the gear selector valve 41, the door selector valve 42, and the dump valve 43. This brings about the landing-gear-lowered and door-closed state illustrated in FIG. 2 through the operation of opening the door (FIG. 7), the operation of lowering the landing gear (FIG. 8), and the operation of closing the door (FIG. 9) which are performed in this order, starting from an initial state (FIG. 6).

Figure 6:
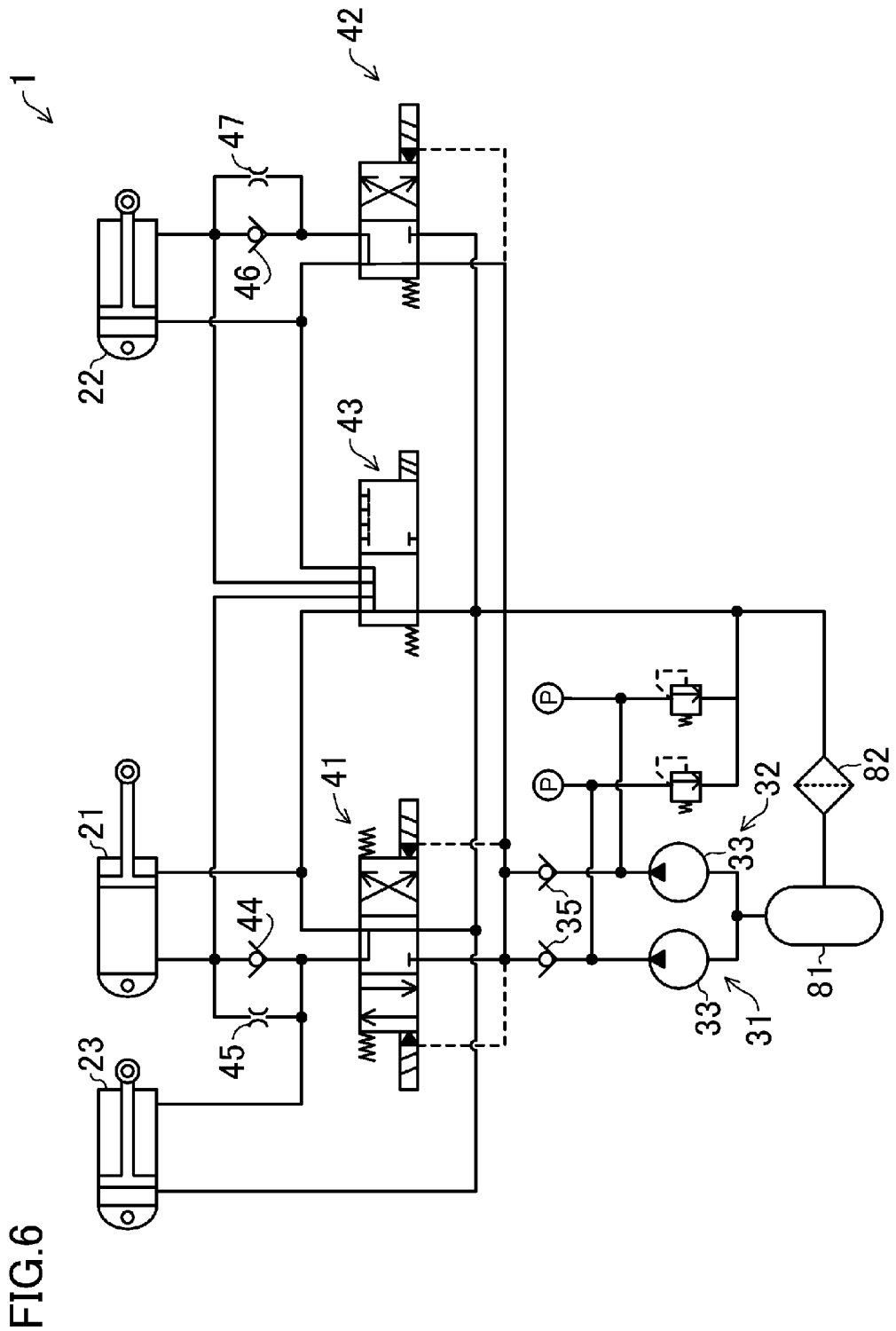
FIG. 6 is a circuit diagram of the EHA system in a landing gear up state (i.e., a landing-gear-lifted and door-closed state).
Figure 7:
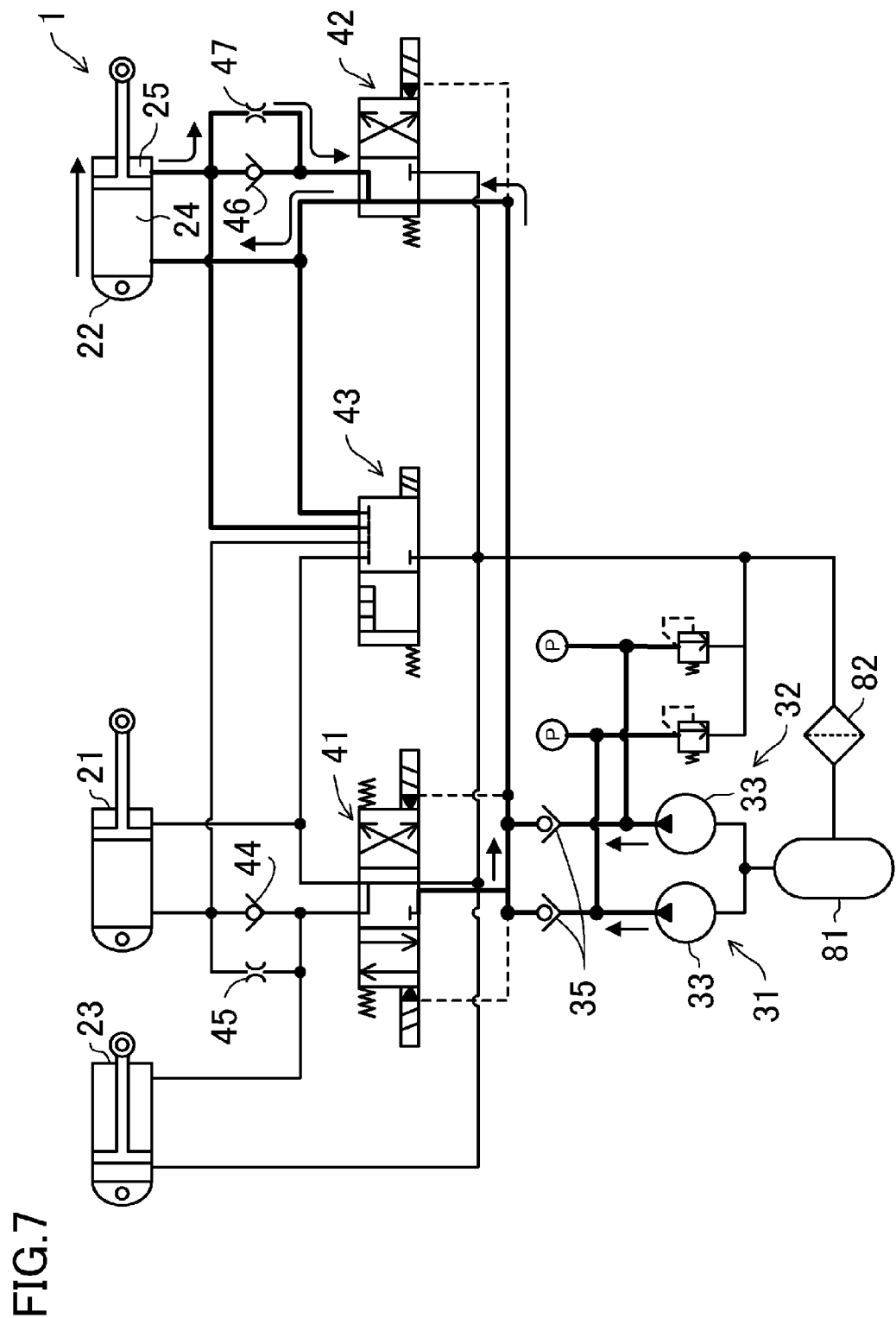
FIG. 7 is a diagram illustrating, upon extension of the landing gear, an EHA system operation from the landing-gear-lifted and door-closed state to a door-opened state.

The same process is performed from the beginning of extension of the landing gear as illustrated in FIG. 6 to the operation of opening the door (FIG. 7). Referring to FIG. 7, the door actuator 22 is extended to open the door of the landing gear bay.

Figure 8:
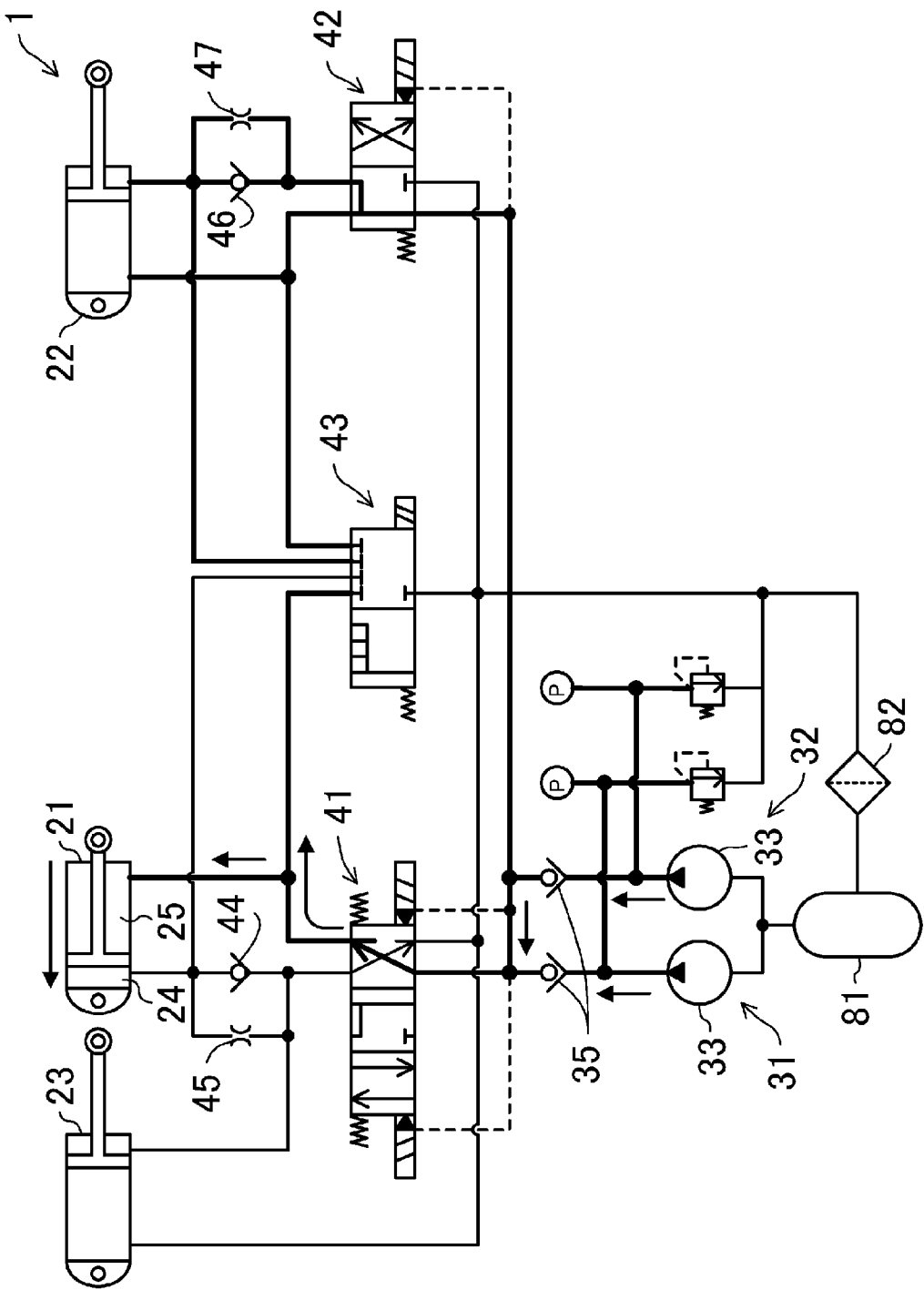
FIG. 8 is a diagram illustrating, upon the extension of the landing gear, an EHA system operation from the landing-gear-lifted and door-opened state to a landing-gear-lowered state.

Subsequently, the controller 9 switches, referring to FIG. 8, the gear selector valve 41 to the second offset position. The B and P ports of the gear selector valve 41 communicate with each other. As indicated by arrows, the first and second hydraulic supply sources 31, 32 supply operation oil to the annulus oil chamber 25 of the gear actuator 21. The gear actuator 21 is retracted as indicated by an arrow illustrated in FIG. 8, and, accordingly, the landing gear stored in the landing gear bay is lowered. Operation oil discharged from the bore oil chamber 24 while the gear actuator 21 is being retracted returns to the reservoir 81 through the orifice 45. The orifice 45 throttles the flow of operation oil to control the speed of retraction of the gear actuator 21. That is, the speed of lowering of the landing gear is controlled. Note that the down-lock release actuator 23 is extended by a load of the biasing member.

Figure 9:
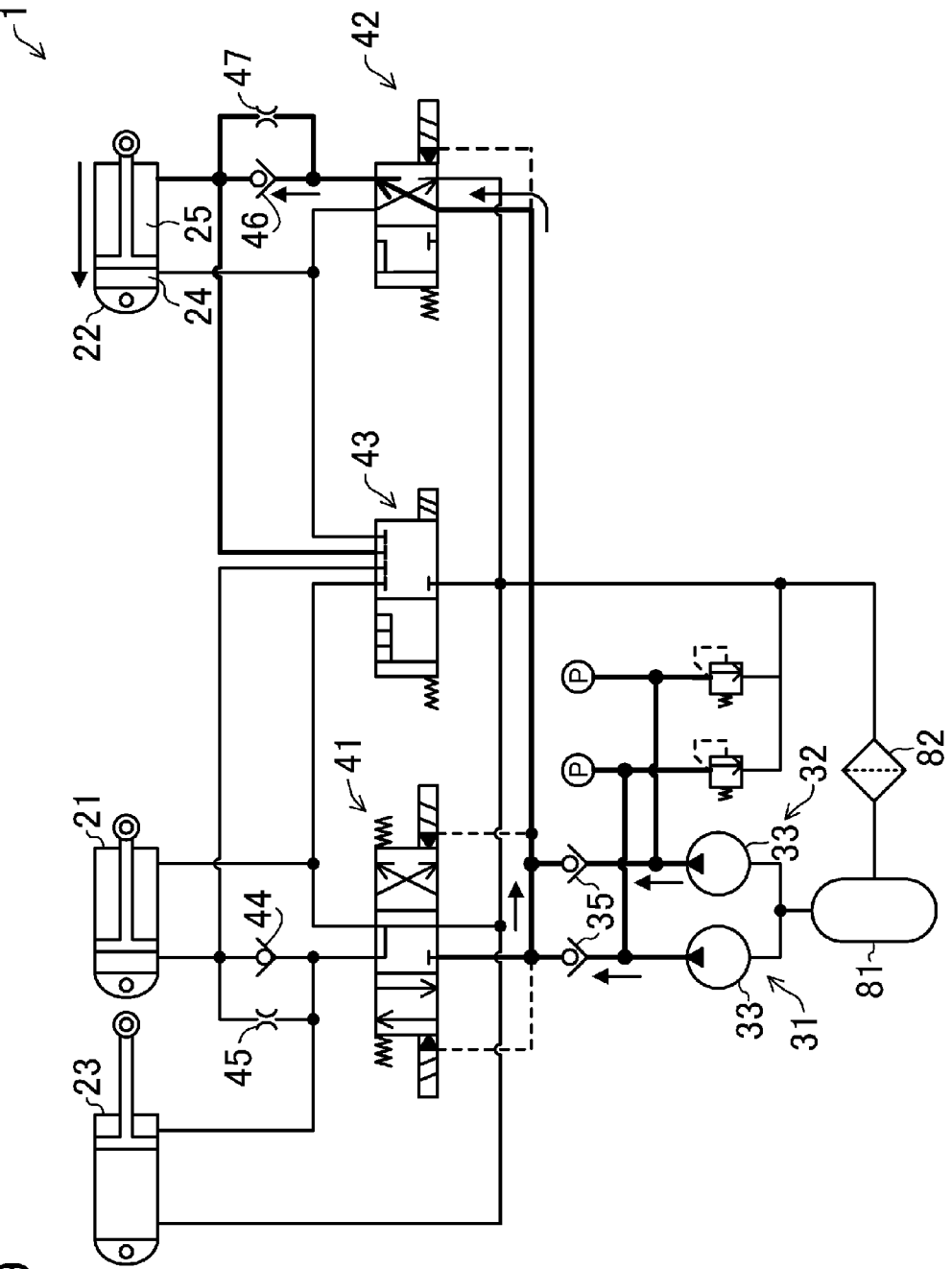
FIG. 9 is a diagram illustrating, upon the extension of the landing gear, an EHA system operation from the landing-gear-lowered and door-opened state to a door-closed state.

After lowering of the landing gear, the controller 9 switches, referring to FIG. 9, the gear selector valve 41 to the center position, and switches the door selector valve 42 to the offset position. As described above, the door actuator 22 is retracted, and the door is closed. After a sequence of operation of extending the landing gear is completed, the controller 9 switches, in order to maintain the state illustrated in FIG. 2, i.e., the landing-gear-lowered and door-closed state, the door selector valve 42 to the normal position, and stops the electric motors 34 of the first and second hydraulic supply sources 31, 32. Moreover, the controller 9 switches the dump valve 43 to the normal position.

As described above, the EHA system 1 includes three hydraulic actuators 2 and two hydraulic supply sources 3, i.e., two hydraulic pumps 33 and two electric motors 34. Thus, as compared to the configuration in which a single hydraulic pump 33 and a single electric motor 34 are provided for a single hydraulic actuator 2, the number of hydraulic pumps 33 and the number of electric motors 34 are reduced, and therefore such reduction is advantageous to reduction in size and weight of the EHA system 1.

The first and second hydraulic supply sources 31, 32 are provided in parallel to each other on the circuit, and any of the hydraulic supply sources 3 is capable of supplying operation oil to each of the gear actuator 21, the door actuator 22, and the down-lock release actuator 23. Thus, when one of the first and second hydraulic supply sources 31, 32 is failed, the other one of the first and second hydraulic supply sources 31, 32 can supply operation oil to each hydraulic actuator 2. The EHA system 1 includes the hydraulic supply sources 3 having redundancy. Moreover, the redundancy of the hydraulic supply source 3 for three hydraulic actuators 2, i.e., the gear actuator 21, the door actuator 22, and the down-lock release actuator 23, is realized in such a manner that the first and second hydraulic supply sources 31, 32 are provided in the EHA system 1. Thus, the size and weight of the EHA system 1 ensuring the redundancy of the hydraulic supply sources 3 are significantly reduced. This is advantageous to the maximum possible reduction in space occupied by the EHA system 1 in the landing gear retraction/extension mechanism and to the maximum possible reduction in weight of the EHA system 1.

In a normal state of the first and second hydraulic supply sources 31, 32, the EHA system 1 illustrated in FIG. 2 is, according to the configuration thereof, capable of operating only one of the first and second hydraulic supply sources 31, 32 to sequentially supply operation oil to each hydraulic actuator 2. However, in the normal state of the first and second hydraulic supply sources 31, 32, the EHA system 1 operates, as described above, both of the first and second hydraulic supply sources 31, 32 to sequentially supply operation oil to each hydraulic actuator 2. According to such a configuration, operation oil supply capacities of the first and second hydraulic supply sources 31, 32 can be set at a relatively-low level, and it is further advantageous to reduction in size and weight of the EHA system 1. Next, the operation oil supply capacities of the first and second hydraulic supply sources 31, 32 will be described.

The EHA system 1 includes a plurality of hydraulic actuators 2, i.e., three hydraulic actuators 2 which are the gear actuator 21, the door actuator 22, and the down-lock release actuator 23. Such hydraulic actuators 2 are sequentially operated to retract/extend the landing gear. Those three hydraulic actuators 2 are different from each other in operation oil supply conditions required for retracting/extending the landing gear. Thus, if the operation oil supply capacity of the hydraulic supply source 3 is set such that the strictest one of the operation oil supply conditions for the hydraulic actuators 2 is satisfied, milder operation oil supply conditions can be satisfied.

Since both of the first and second hydraulic supply sources 31, 32 sequentially supply, as described above, operation oil to each hydraulic actuator 2 in the normal state of the first and second hydraulic supply sources 31, 32, the capacity of each hydraulic supply source may be set such that the conditions for supplying operation oil to the hydraulic actuators 2 are satisfied by cooperation of the first and second hydraulic supply sources 31, 32. This allows setting of the supply capacity of each hydraulic supply source 3 at a relatively-low level, and therefore reduction in size and weight of each hydraulic supply source 3 can be realized.

For the foregoing reasons, if the supply capacity of the hydraulic supply source 3 satisfying the strictest operation oil supply condition is 100%, the supply capacity of each hydraulic supply source 3 is set at 50% in the EHA system 1. Thus, as well as satisfying the strictest operation oil supply condition, the milder supply conditions can be, in the normal state of the hydraulic supply sources 3, satisfied even if the EHA system 1 is operated with lower supply capacities of the first and second hydraulic supply sources 31, 32.

However, in the configuration in which the supply capacity of each hydraulic supply source 3 is set at 50%, when one of the hydraulic supply sources 3 is failed, the strictest operation oil supply condition cannot be satisfied only by the other hydraulic supply source 3, i.e., a single hydraulic supply source 3. Thus, there is a possibility that a time required from start to finish of a sequence of operation of retracting the landing gear significantly increases in a failure state than in the normal state and that a time required from start to finish of a sequence of operation of extending the landing gear significantly increases in the failure state than in the normal state.

In the normal state, the milder supply conditions than the strictest operation oil supply condition are satisfied in such a manner that the hydraulic supply sources 3 are operated with lower supply capacities. Thus, if one of the hydraulic supply sources is operated with a higher supply capacity, the relatively-mild supply conditions can be satisfied even in the failure state. As described above, in the sequence of operation of retracting the landing gear, the plurality of hydraulic actuators 2 are sequentially operated, and the plurality of supply conditions are combined together. Thus, even if the strictest operation oil supply condition cannot be satisfied, the time required from start to finish of the sequence of operation of retracting the landing gear does not increase. That is, in the configuration in which the supply capacity of each hydraulic supply source 3 is set at 50%, the time required from start to finish of the sequence of operation of retracting the landing gear is not substantially different between the failure state and the normal state. Similarly, the time required from start to finish of the sequence of operation of extending the landing gear is not substantially different between the failure state and the normal state.

FIG. 10 illustrates a design example of the hydraulic supply source 3 of the EHA system 1. Suppose that the operation of retracting the landing gear is set such that a time for operation of opening the door is two seconds, a time for operation of lifting the landing gear is nine seconds, and a time for operation of closing the door is two seconds. Thus, the time required from start to finish of the sequence of operation of retracting the landing gear is set at 13 seconds. On the other hand, suppose that the operation of extending the landing gear is set such that the time for operation of opening the door is two seconds, a time for operation of lowering the landing gear is 12 seconds, and the time for operation of closing the door is two seconds. Thus, the time required from start to finish of the sequence of operation of extending the landing gear is set at 16 seconds.

Among the foregoing operation settings, the setting at which operation oil is supplied to the door actuator 22 such that the door is closed in two seconds is considered as the strictest supply condition. Thus, the supply capacity of each hydraulic supply source 3 is set such that the foregoing strictest supply condition is satisfied by the first and second hydraulic supply sources 31, 32. Specifically, in the example illustrated in FIG. 10, the supply capacity of each of the first and second hydraulic supply sources 31, 32 is set at 50%, and therefore the maximum rotational speed of the electric motor 34 of each hydraulic supply source 3 is set at 13736 rpm. In the normal state, the electric motors 34 of the first and second hydraulic supply sources 31, 32 are driven at the maximum rotational speed of 13736 rpm in the operation of closing the door. This satisfies the supply conditions, and the operation of closing the door is completed in two seconds. On the other hand, in the door opening operation in which the supply conditions are milder than those in the door closing operation, the supply conditions are satisfied in such a manner that the electric motors 34 of the first and second hydraulic supply sources 31, 32 are driven at a rotational speed lower than the maximum rotational speed, specifically at 5344 rpm. As a result, the operation of opening the door is completed in two seconds. Similarly, in the operation of lifting the landing gear, the supply conditions are satisfied in such a manner that the electric motors 34 of the first and second hydraulic supply sources 31, 32 are driven at a rotational speed of 9897 rpm lower than the maximum rotational speed. In the operation of lowering the landing gear, the supply conditions are satisfied in such a manner that the electric motors 34 of the first and second hydraulic supply sources 31, 32 are driven at a rotational speed of 4737 rpm lower than the maximum rotational speed.

When one of the first and second hydraulic supply sources 31, 32 is failed, only one of the hydraulic supply sources 3 is, as described above, driven to supply operation oil. In such a case, in the operation of opening the door, the controller 9 drives, referring to FIG. 10, the electric motor 34 of the hydraulic supply source 3 at a rotational speed of 10689 rpm higher than that (5344 rpm) in the normal state. This satisfies the supply conditions, and therefore the operation of opening the door can be completed in two seconds as in the normal state. Similarly, in the operation of lifting the landing gear, the controller 9 drives the electric motor 34 at a rotational speed of 13736 rpm higher than that in the normal state. That is, the electric motor 34 is driven at the maximum rotational speed. In such a case, since the operation oil supply conditions are not satisfied, the operation of lifting the landing gear is prolonged as compared to that in the normal state, and is completed in 12.16 seconds. In the operation of closing the door, the controller 9 drives the electric motor 34 at the maximum rotational speed (13736 rpm) equal to that in the normal state. In such a case, since the operation oil supply conditions are not satisfied, the operation of lifting the landing gear is prolonged as compared to that in the normal state, and is completed in 3.29 seconds. As a result, in the failure state, the time required for the sequence of operation of retracting the landing gear is 17.45 seconds, and is extended by 34% as compared to that in the normal state. Although the time required for operation of retracting the landing gear is longer in the failure state than in the normal state as described above, such extension of the required time can be considered within an allowable range.

In the operation of lowering the landing gear, the controller 9 drives the electric motor 34 at a rotational speed of 9473 rpm higher than that (4737 rpm) in the normal state. Thus, the operation of lowering the landing gear can be completed in 12 seconds as in the normal state. Accordingly, the time required for the sequence of operation of extending the landing gear in the failure state is 17.29 seconds, and the ratio of the required time in the failure state to the required time in the normal time is 1.08. That is, the required time for operation of extending the landing gear is not substantially changed between the normal state and the failure state.

In the EHA system 1 having the foregoing configuration, the supply capacity of each hydraulic supply source 3 can be set at a relatively-low level to reduce the size and weight of the EHA system 1, as well as increasing the rotational speed of the electric motor 34 in the failure state as compared to that in the normal state to reduce performance degradation. Moreover, since the hydraulic supply sources 3 are set at the same supply capacity (at 50% in the example illustrated in FIG. 10), the degree of performance degradation is similar between the case where the first hydraulic supply source is failed and the case where the second hydraulic supply source is failed.

The supply capacity of each hydraulic supply source 3 is not limited to 50% of the required supply capacity, and may be set at 50% or more. This further reduces performance degradation in the failure state. Note that a higher supply capacity of each hydraulic supply source 3 may be disadvantageous to reduction in size and weight of the hydraulic supply source. Thus, the supply capacity of each hydraulic supply source 3 may be arbitrarily set considering a balance between reduction in size and weight of the hydraulic supply source and performance degradation in the failure state.

Second Embodiment

Figure 11:
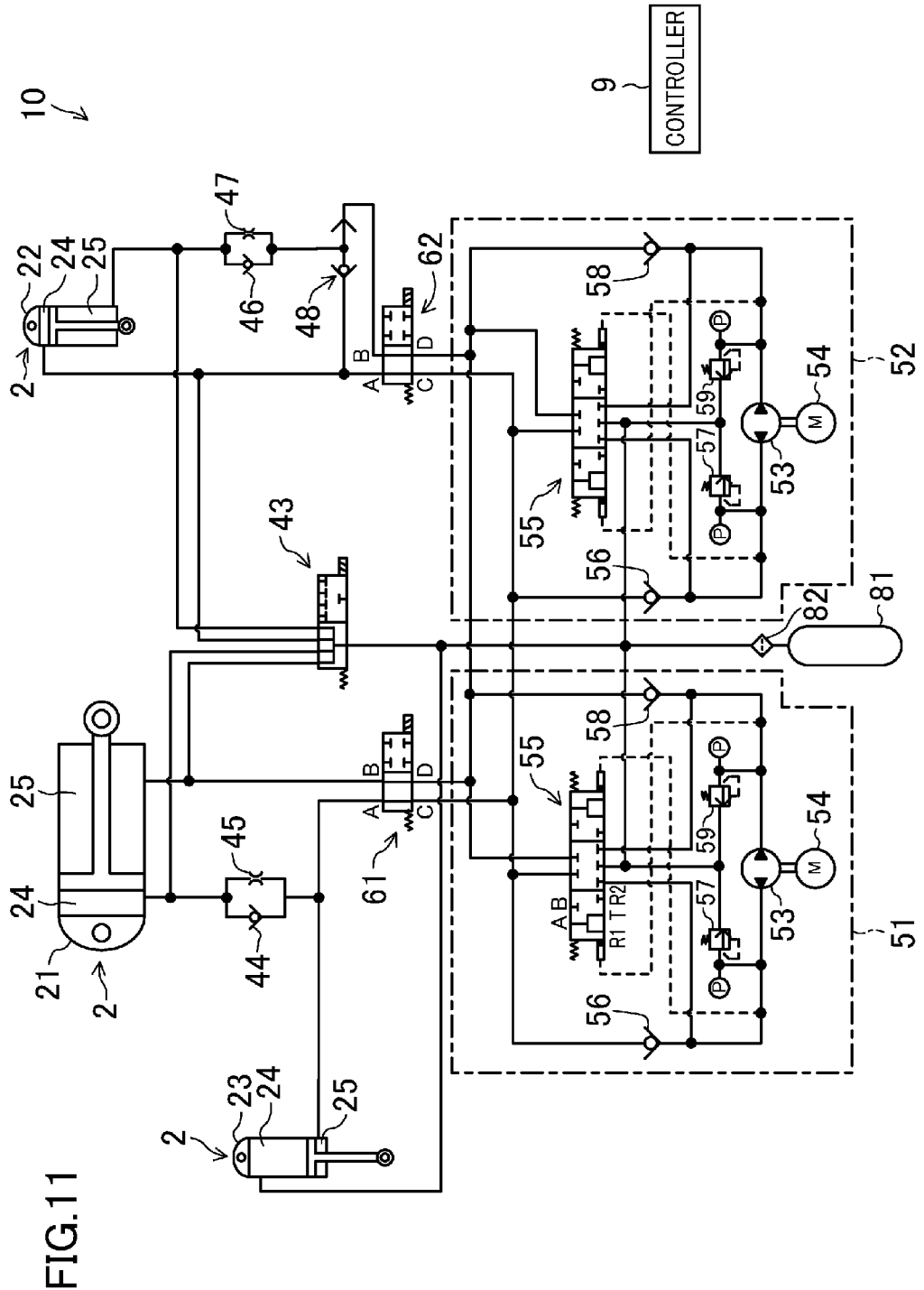
FIG. 11 is a circuit diagram of a landing gear retraction/extension EHA system of a second embodiment illustrating a landing gear down state (i.e., a landing-gear-lowered and door-closed state).
Figure 12:
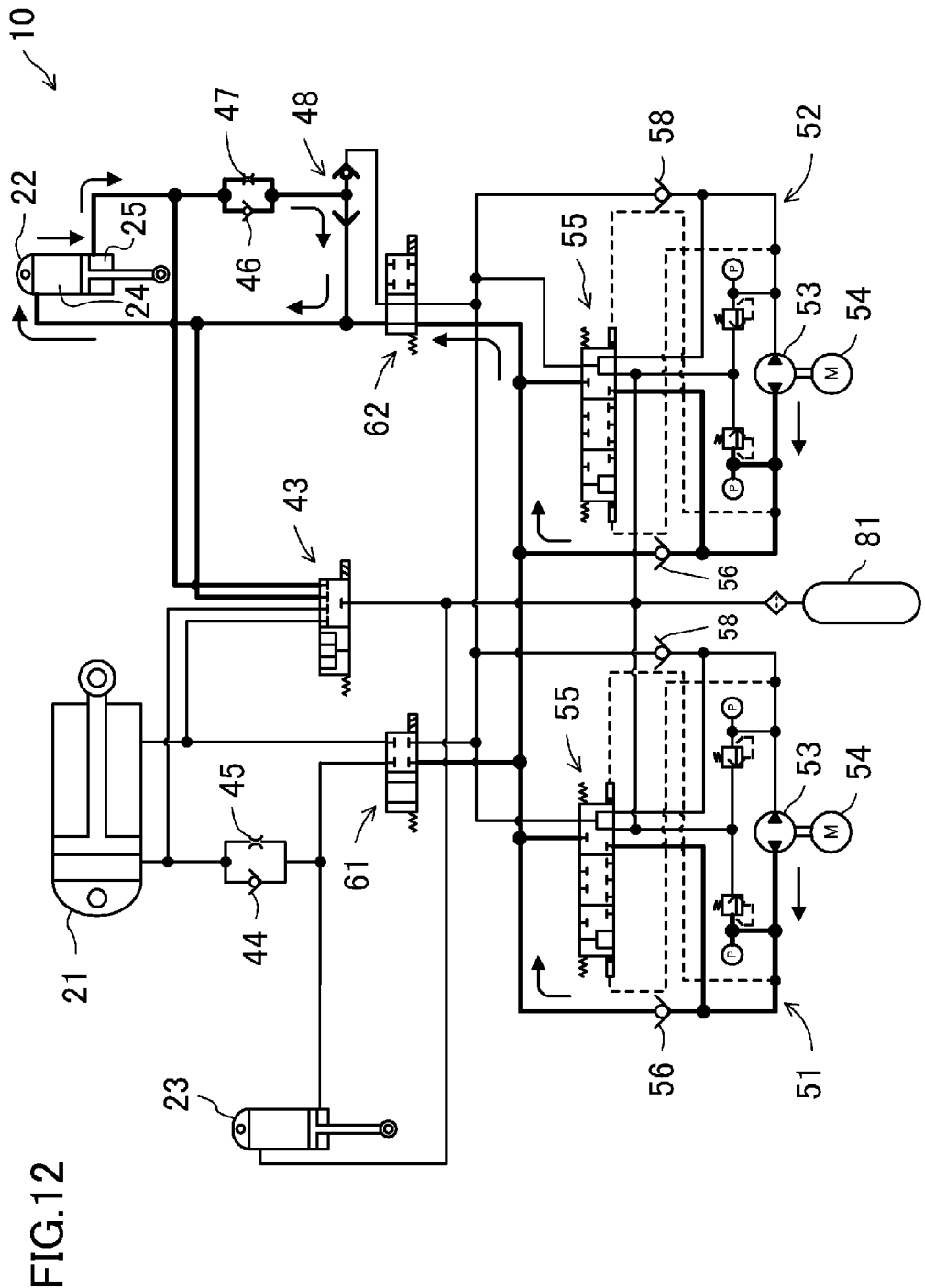
FIG. 12 is a diagram illustrating, upon retraction of a landing gear, an EHA system operation from the landing-gear-lowered and door-closed state to a door-opened state.

FIG. 11 is a circuit diagram of an EHA system 10 of a second embodiment. The EHA system 10 is different from the EHA system 1 illustrated in FIG. 2 in that a two-direction rotary hydraulic pump is employed. Note that the same reference numerals as those shown in the EHA system 1 illustrated in FIG. 2 are used to represent equivalent elements of the EHA system 10 illustrated in FIG. 11, and the description thereof will not be repeated. Moreover, in FIG. 11, an operation oil path is indicated by a solid line, and a pilot hydraulic path is indicated by a dashed line. Further, an electric signal path from a controller 9 to each motor 54 and each valve 43, 61, 62 is not shown in the figure.

For redundancy of a hydraulic supply source, the EHA system 10 illustrated in FIG. 11 includes first and second hydraulic supply sources 51, 52. The first and second hydraulic supply sources 51, 52 are provided in parallel to each other on a circuit. Since configurations of the first and second hydraulic supply sources 51, 52 are the same as each other, the configuration of the first hydraulic supply source 51 will be descried herein as an example.

The first hydraulic supply source 51 includes a single hydraulic pump 53 with a first port (i.e., a port on the left side as viewed in FIG. 11) and a second port (i.e., a port on the right side as viewed in FIG. 11), a single electric motor 54 configured to drive the hydraulic pump 53, and a return valve 55.

The return valve 55 is a five-port three-position switching valve formed with five ports, i.e., a R1 port, a R2 port, a T port, an A port, and a B port. The return valve 55 has a function to allow, in association with switching of outlet and inlet directions of the hydraulic pump 53, operation oil returning from a hydraulic actuator 2 to return selectively to the first or second port of the hydraulic pump 53. The R1 port of the return valve 55 is connected to the first port of the hydraulic pump 53, and the R2 port of the return valve 55 is connected to the second port of the hydraulic pump 53. The T port of the return valve 55 is connected to a reservoir 81 through a filter 82. The A port of the return valve 55 is connected to each of a gear selector valve 61 and a door selector valve 62 which will be described later, and the B port of the return valve 55 is also connected to each of the gear selector valve 61 and the door selector valve 62.

The return valve 55 is a hydraulic pilot type switching valve, and a spool is biased to a center position by a spring. At the center position, the return valve 55 blocks all of the R1, R2, T, A, and B ports. At a first offset position (i.e., a position on the left side as viewed in FIG. 11), the return valve 55 allows the A port to communicate with each of the R1 and T ports, and blocks the B and R2 ports. On the other hand, at a second offset position (i.e., a position on the right side as viewed in FIG. 11), the return valve 55 allows the B port to communicate with each of the T and R2 ports, and blocks the A and R1 ports. Although will be described in detail later, when the hydraulic pump 53 is driven such that the first port of the hydraulic pump 53 serves as an outlet port and the second port of the hydraulic pump 53 serves as an inlet port, the return valve 55 is switched to the second offset position. On the other hand, when the hydraulic pump 53 is driven such that the first port of the hydraulic pump 53 serves as the inlet port and the second port of the hydraulic pump 53 serves as the outlet port, the return valve 55 is switched to the first offset position.

The hydraulic pump 53 is, e.g., a swash plate-type piston pump. Moreover, the electric motor 54 is, e.g., a three-phase motor. The outlet and inlet directions of the hydraulic pump 53 may be switched by reversing a rotation direction of the electric motor 54. Alternatively, the outlet and inlet directions of the hydraulic pump 53 may be switched by changing the inclination angle of a swash plate of the swash plate-type piston pump.

As described above, the first port of the hydraulic pump 53 is connected to the R1 port of the return valve 55, and is connected to each of C ports of the gear selector valve 61 and the door selector valve 62 which will be described later through a check valve 56. The check valve 56 is, as described above, a valve configured to prevent a backflow to the hydraulic supply source 51, 52 in a failure state. The first port of the hydraulic pump 53 is also connected to the reservoir 81 through a relief valve 57. Similarly, the second port of the hydraulic pump 53 is connected to the R2 port of the return valve 55, and is connected to each of D ports of the gear selector valve 61 and the door selector valve 62 through a check valve 58. Moreover, the second port of the hydraulic pump 53 is connected to the reservoir 81 through a relief valve 59. The check valve 58 is also a valve configured to prevent a backflow to the hydraulic supply source 51, 52 in the failure state.

As in the hydraulic pump 53 of the first hydraulic supply source 51, the first port of the hydraulic pump 53 of the second hydraulic supply source 52 is connected to the R1 port of the return valve 55, and is connected to each of the C ports of the gear selector valve 61 and the door selector valve 62 through the check valve 56. Moreover, the second port of the hydraulic pump 53 is connected to the R2 port of the return valve 55, and is connected to each of the D ports of the gear selector valve 61 and the door selector valve 62 through the check valve 58.

The gear selector valve 61 is a four-port two-position switching valve formed with four ports, i.e., an A port, a B port, the C port, and the D port. The gear selector valve 61 has a function to selectively supply operation oil to a gear actuator 21 and a down-lock release actuator 23. The C port of the gear selector valve 61 is, as described above, connected to the first port of the hydraulic pump 53, and is connected to the A port of the return valve 55. The D port of the gear selector valve 61 is connected to the second port of the hydraulic pump 53, and is connected to the B port of the return valve 55. The A port of the gear selector valve 61 is connected to each of a bore oil chamber 24 of the gear actuator 21 and an annulus oil chamber 25 of the down-lock release actuator 23. The B port of the gear selector valve 61 is connected to an annulus oil chamber 25 of the gear actuator 21.

The gear selector valve 61 is also a solenoid valve in which a spool directly driven by a solenoid is biased to a normal position by a spring. At the normal position, the gear selector valve 61 allows the A and C ports to communicate with each other, and allows the B and D ports to communicate with each other. On the other hand, at an offset position, the gear selector valve 61 blocks all of the A, B, C, and D ports. The controller 9 switches the gear selector valve 61 to switch between the state in which operation oil is supplied to the bore oil chamber 24 or the annulus oil chamber 25 of the gear actuator 21 and the state in which an operation oil supply to the bore oil chamber 24 and the annulus oil chamber 25 of the gear actuator 21 is stopped and to switch between the state in which operation oil is supplied to the annulus oil chamber 25 of the down-lock release actuator 23 and the state in which an operation oil supply to the annulus oil chamber 25 of the down-lock release actuator 23 is stopped.

As in the gear selector valve 61, the door selector valve 62 is a four-port two-position switching valve formed with four ports, i.e., an A port, a B port, the C port, and the D port. The door selector valve 62 has a function to selectively supply operation oil to a door actuator 22. The C port of the door selector valve 62 is, as described above, connected to the first port of each hydraulic pump 53, and is connected to the A port of the return valve 55. The D port of the door selector valve 62 is connected to the second port of each hydraulic pump 53, and is connected to the B port of the return valve 55. The A port of the door selector valve 62 is connected to a bore oil chamber 24 of the door actuator 22, and the B port of the door selector valve 62 is connected to an annulus oil chamber 25 of the door actuator 22 through a shuttle valve 48. The shuttle valve 48 is formed with a first port connected to the B port of the door selector valve 62, and a second port connected to the A port of the door selector valve 62. The shuttle valve 48 is configured to open one of the first and second ports which has a higher pressure. The shuttle valve 48 switches between the state in which the annulus oil chamber 25 of the door actuator 22 and the B port of the door selector valve 62 communicate with each other and the state in which the annulus oil chamber 25 and the bore oil chamber 24 of the door actuator 22 communicate with each other.

The door selector valve 62 is also a solenoid valve in which a spool directly driven by a solenoid is biased to a normal position by a spring, At the normal position, the door selector valve 62 allows the A and C ports to communicate with each other, and allows the B and D ports to communicate with each other. On the other hand, at an offset position, the door selector valve 62 blocks all of the A, B, C, and D ports. The controller 9 switches the door selector valve 62 to switch between the state in which operation oil is supplied to the bore oil chamber 24 or the annulus oil chamber 25 of the door actuator 22 and the state in which an operation oil supply to the bore oil chamber 24 and the annulus oil chamber 25 of the door actuator 22 is stopped.

Next, steps of operation of the EHA system 1 for retracting a landing gear will be described with reference to FIGS. 11-15. In the operation of retracting the landing gear, the operation of opening a door (FIG. 12), the operation of lifting the landing gear (FIG. 13), and the operation of closing the door (FIG. 14) are, starting from an initial landing-gear-lowered and door-closed state (FIG. 11), performed in this order to bring about the state (FIG. 15) in which retraction of the landing gear is completed. In FIGS. 12-15, a path through which operation oil is supplied is indicated by a thick solid line, a path in which operation oil is held is indicated by a thick dashed line, the pilot hydraulic path is indicated by a dashed line, and a path connected to the reservoir 81 is indicated by a solid line.

At the beginning of retraction of the landing gear, the EHA system 10 is in the state illustrated in FIG. 11. The gear selector valve 61, the door selector valve 62, and the dump valve 43 are at the normal position, and each return valve 55 is at the center position. Starting from such an initial state, the controller 9 switches, referring to FIG. 12, the dump valve 43 to an offset position, and blocks all of the A-D and T ports. In addition, the controller 9 also switches the gear selector valve 61 to the offset position, and blocks all of the A-D ports.

Subsequently, the controller 9 drives each of the hydraulic pumps 53 of the first and second hydraulic supply sources 51, 52 such that the second port of the hydraulic pump 53 serves as an inlet port and the first port of the hydraulic pump 53 serves as an outlet port. Thus, referring to FIG. 12, the return valve 55 is switched to the second offset position, and, accordingly, operation oil is supplied from both of the first and second hydraulic supply sources 51, 52 to the A port of the door selector valve 62. As described above, both of the first and second hydraulic supply sources 51, 52 supply operation oil to the bore oil chamber 24 of the door actuator 22. The door actuator 22 is extended as indicated by an arrow illustrated in FIG. 12. Since the shuttle valve 48 is in the state in which the annulus oil chamber 25 and the bore oil chamber 24 of the door actuator 22 communicate with each other, operation oil discharged from the annulus oil chamber 25 while the door actuator 22 is being extended is supplied to the bore oil chamber 24 of the door actuator 22 through the orifice 47. This opens the door of a landing gear bay.

Figure 13:
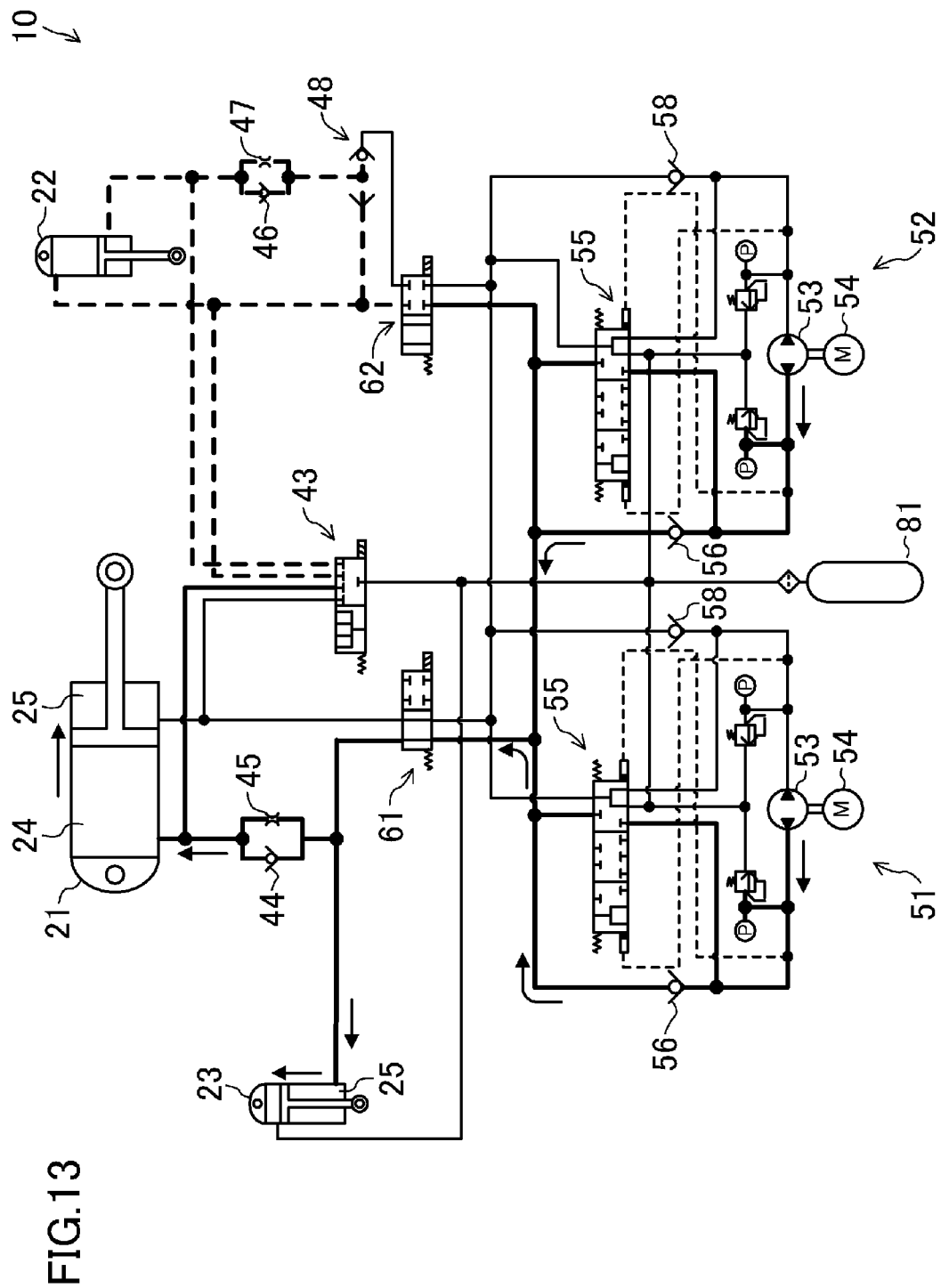
FIG. 13 is a diagram illustrating, upon the retraction of the landing gear, an EHA system operation from the landing-gear-lowered and door-opened state to a landing-gear-lifted state.

After the door of the landing gear bay is opened, the controller 9 switches, referring to FIG. 13, the door selector valve 62 to the offset position. Thus, the hydraulic pressure of the door actuator 22 is maintained. The controller 9 also switches the gear selector valve 61 to the normal position. Thus, the A and C ports of the gear selector valve 61 communicate with each other, and the B and D ports of the gear selector valve 61 communicate with each other. The hydraulic pump 53 is driven in the state in which the first port serves as the outlet port and the second port serves as the inlet port. Thus, the first and second hydraulic supply sources 51, 52 supply, as indicated by arrows illustrated in FIG. 13, operation oil to the annulus oil chamber 25 of the down-lock release actuator 23 through the gear selector valve 61. The down-lock release actuator 23 is retracted to release a mechanism for maintaining a landing gear down state. Moreover, the first and second hydraulic supply sources 51, 52 supply operation oil to the bore oil chamber 24 of the gear actuator 21 through the check valve 44. The gear actuator 21 is extended as indicated by an arrow illustrated in FIG. 13, thereby lifting the landing gear which is not shown in the figure. Note that operation oil discharged from the annulus oil chamber 25 while the gear actuator 21 is being extended returns to the second port of the hydraulic pump 53 through the gear selector valve 61 and the return valve 55.

Figure 14:
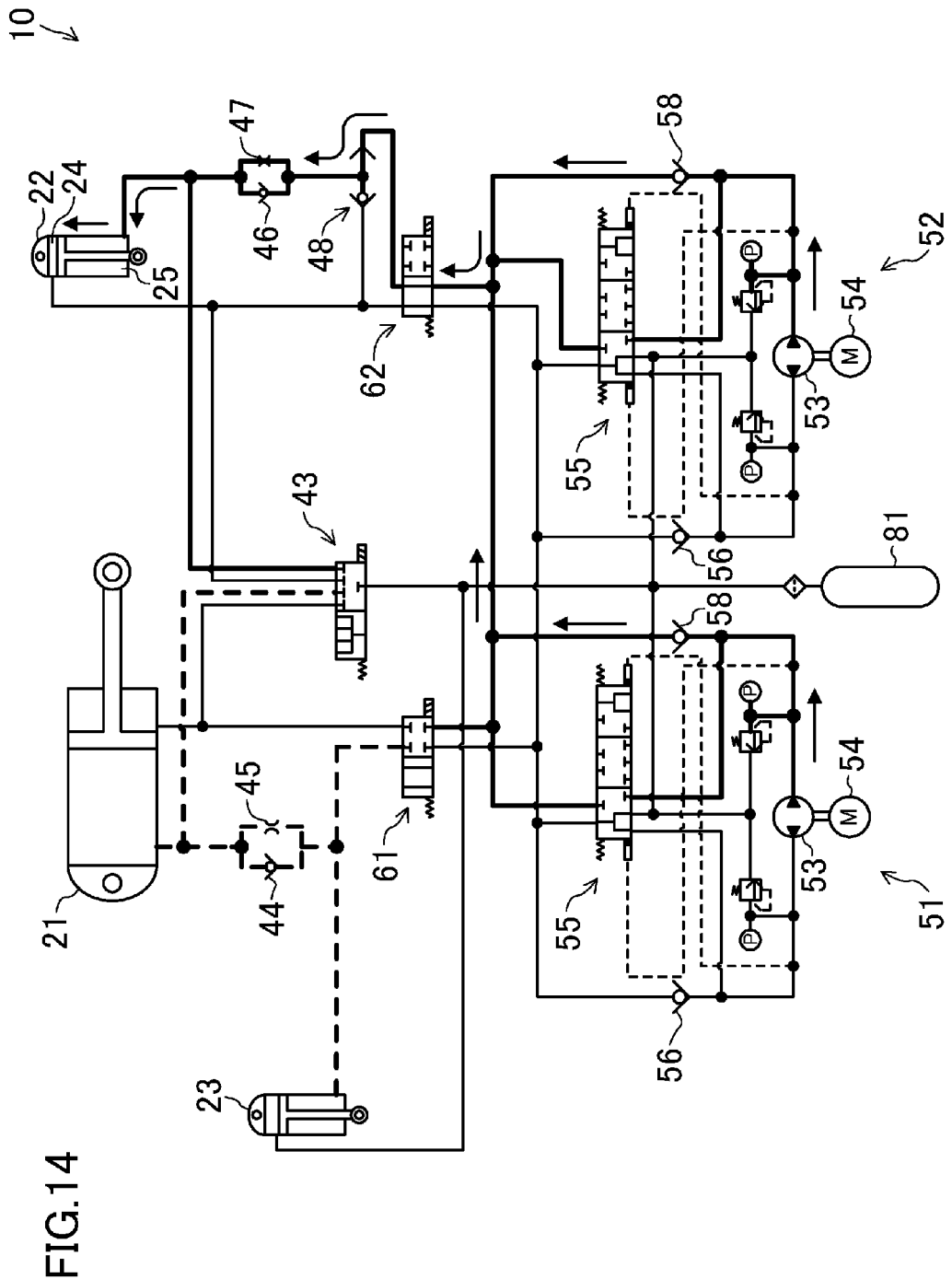
FIG. 14 is a diagram illustrating, upon the retraction of the landing gear, an EHA system operation from the landing-gear-lifted and door-opened state to a door-closed state.

After the landing gear is stored in the landing gear bay, the controller 9 switches, referring to FIG. 14, the gear selector valve 61 to the offset position. Thus, the hydraulic pressure of the gear actuator 21 is maintained. The controller 9 switches the door selector valve 62 to the normal position. Moreover, the controller 9 reverses outlet and inlet directions of the hydraulic pumps 53 of the first and second hydraulic supply sources 51, 52, and drives each hydraulic pump 53 such that the first port of the hydraulic pump 53 serves as the inlet port and the second port of the hydraulic pump 53 serves as the outlet port. As a result, the first and second hydraulic supply sources 51, 52 supply, referring to FIG. 14, operation oil to the annulus oil chamber 25 of the door actuator 22. The door actuator 22 is retracted to close the door, and a sequence of operation of retracting the landing gear is completed. After completion of refraction of the landing gear, the controller 9 switches, referring to FIG. 15, each of the gear selector valve 61 and the dump valve 43 to the normal position, and stops the electric motors 54 of the first and second hydraulic supply sources 51, 52. This switches the return valve 55 to the center position.

Figure 17:
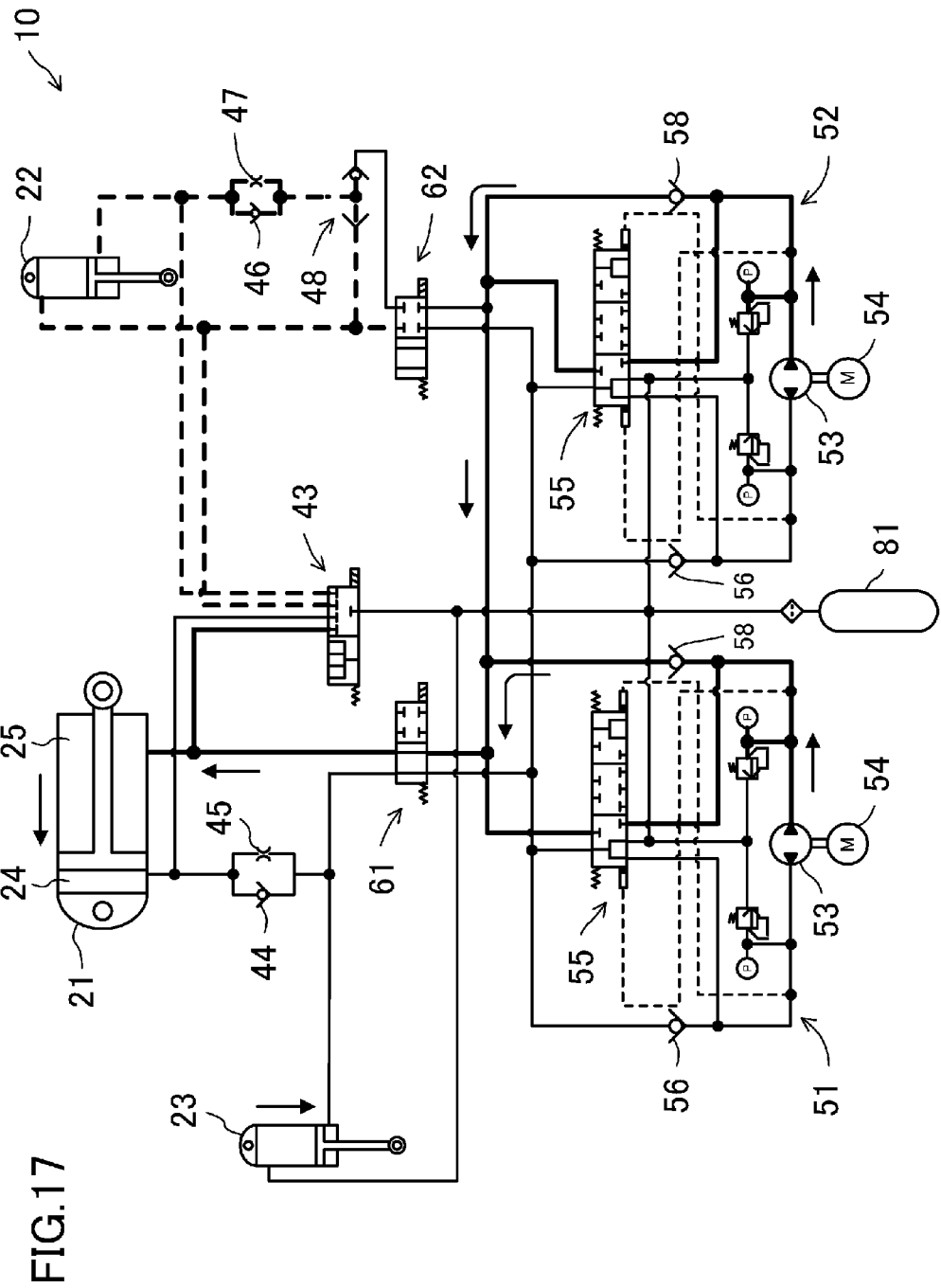
FIG. 17 is a diagram illustrating, upon the extension of the landing gear, an EHA system operation from the landing-gear-lifted and door-opened state to a landing-gear-lowered state.
Figure 18:
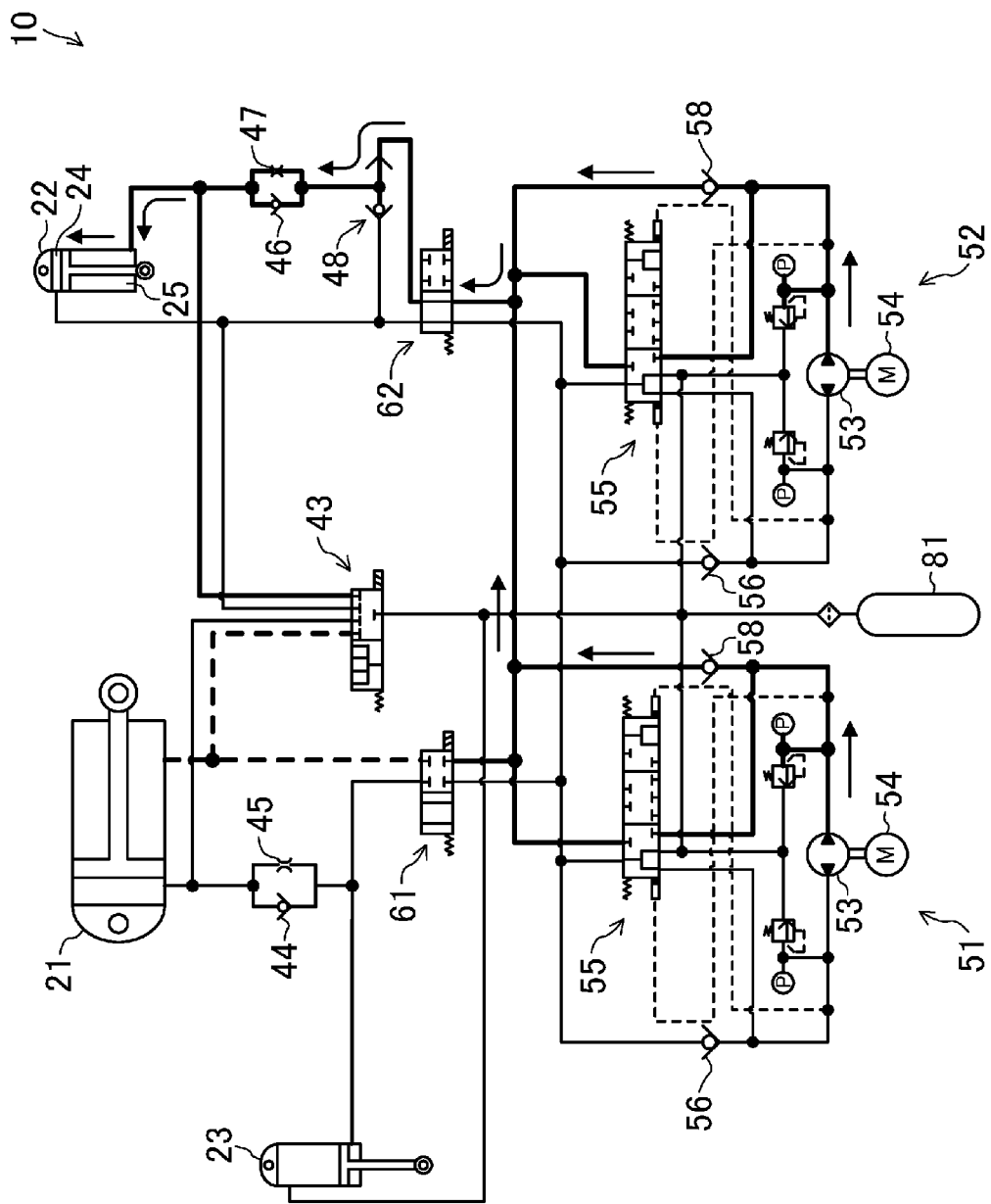
FIG. 18 is a diagram illustrating, upon the extension of the landing gear, an EHA system operation from the landing-gear-lowered and door-opened state to a door-closed state.

Next, steps of operation of the EHA system 10 for extending the landing gear will be described with reference to FIGS. 15-18. In the operation of extending the landing gear, the operation of opening the door (FIG. 16), the operation of lowering the landing gear (FIG. 17), and the operation of closing the door (FIG. 18) are, starting from an initial state (FIG. 15), performed in this order to bring about the state (FIG. 11) in which extension of the landing gear is completed. In FIGS. 16-18, the path through which operation oil is supplied is, as in FIGS. 12-15, indicated by a thick solid line, the path in which operation oil is held is indicated by a thick dashed line, the pilot hydraulic path is indicated by a dashed line, and the path connected to the reservoir 81 is indicated by a solid line.

Figure 15:
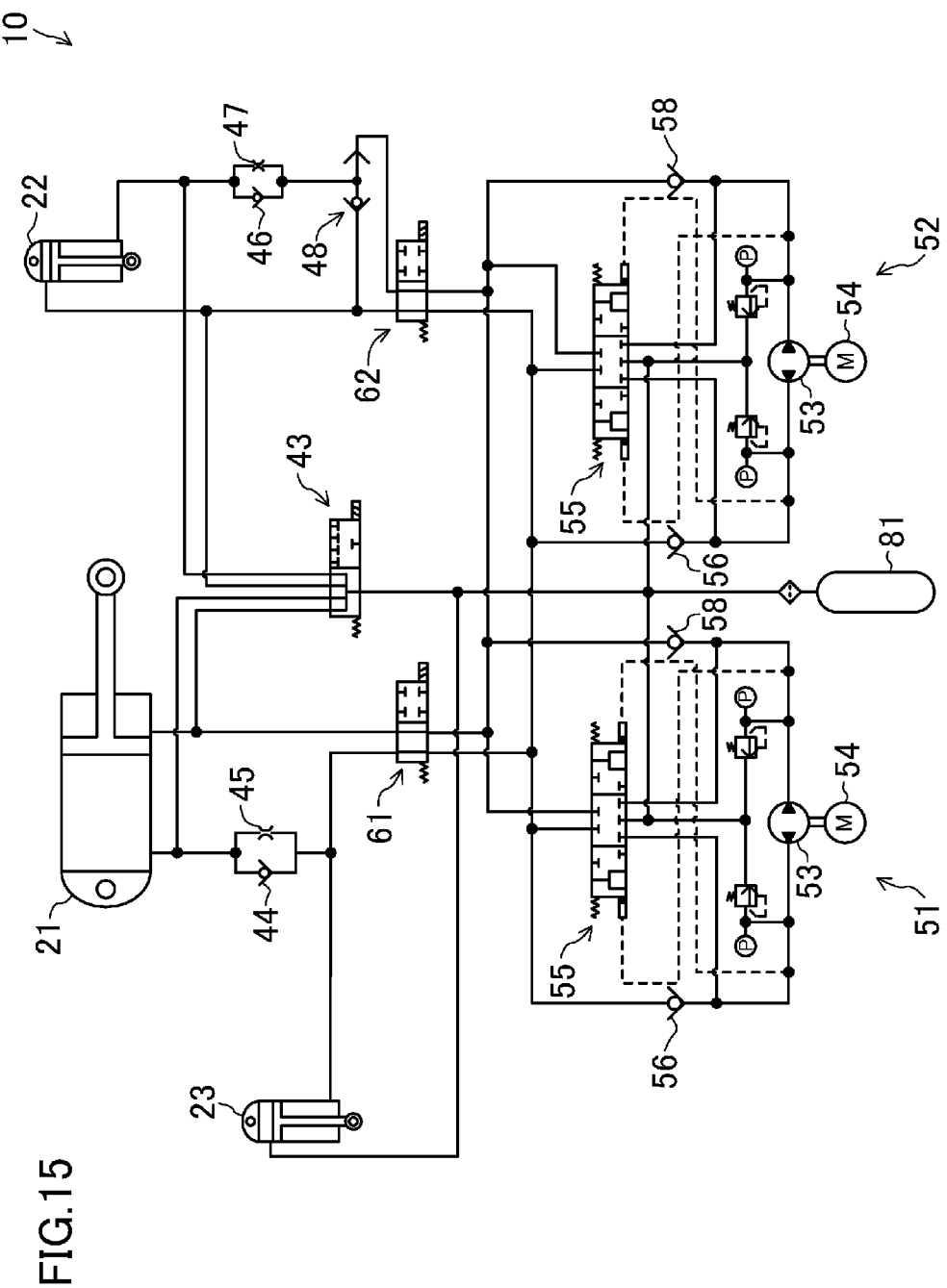
FIG. 15 is a circuit diagram of the EHA system in a landing gear up state (i.e., a landing-gear-lifted and door-closed state).
Figure 16:
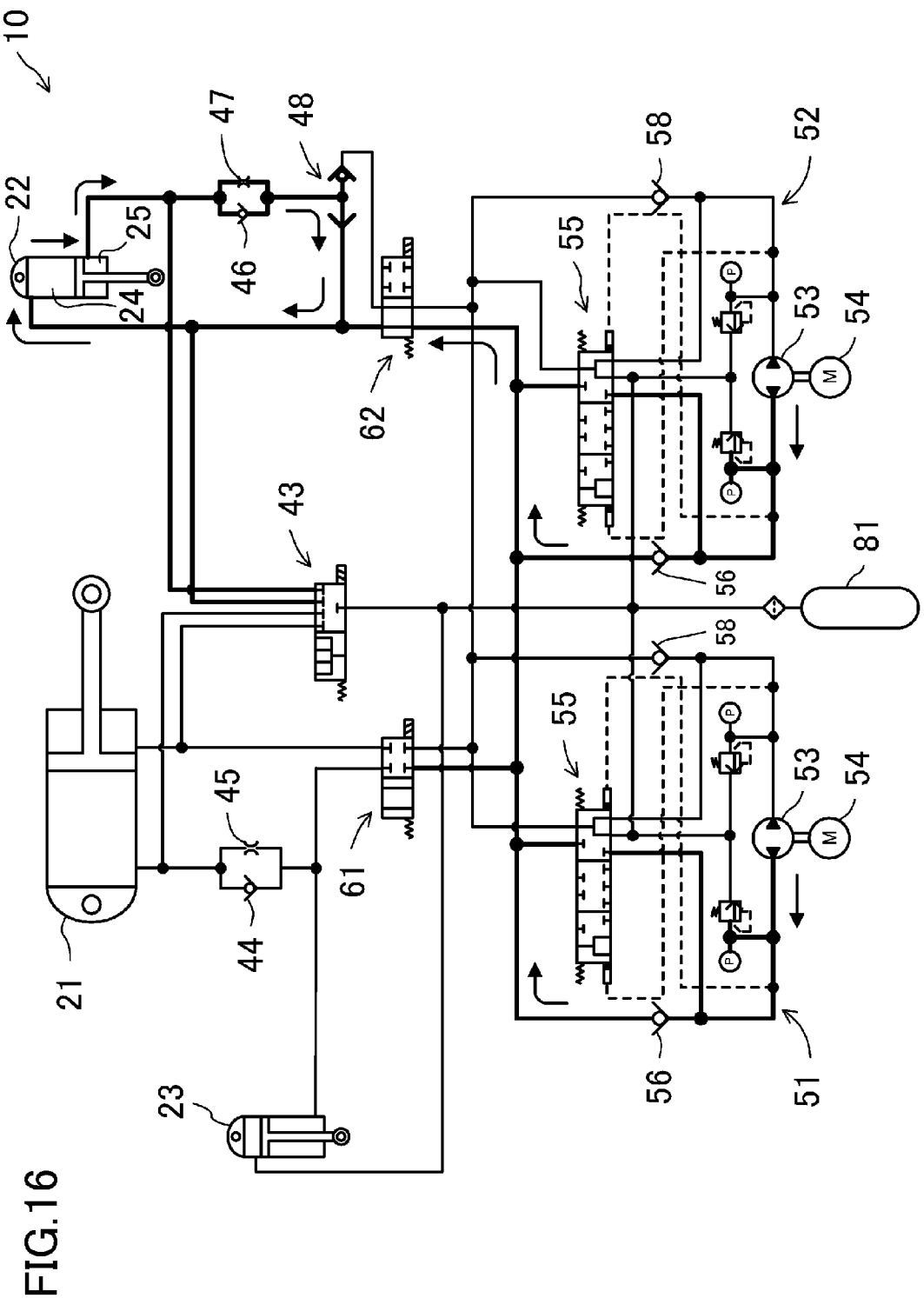
FIG. 16 is a diagram illustrating, upon extension of a landing gear, an EHA system operation from the landing-gear-lifted and door-closed state to a door-opened state.

The same process is performed from the beginning of extension of the landing gear as illustrated in FIG. 15 to the operation of opening the door as illustrated in FIG. 16. Referring to FIG. 16, the door actuator 22 is extended to open the door of the landing gear bay.

Subsequently, the controller 9 switches, referring to FIG. 17, the door selector valve 62 to the offset position, and switches the gear selector valve 61 to the normal position. Moreover, the controller 9 reverses the outlet and inlet directions of the hydraulic pumps 53 of the first and second hydraulic supply sources 51, 52, and drives each hydraulic pump 53 such that the first port of the hydraulic pump 53 serves as the inlet port and the second port of the hydraulic pump 53 serves as the outlet port. Thus, the return valve 55 is switched to the first offset position, and the first and second hydraulic supply sources 51, 52 supply, as indicated by arrows, operation oil to the annulus oil chamber 25 of the gear actuator 21. The gear actuator 21 is retracted as indicated by an arrow illustrated in FIG. 17, and the landing gear stored in the landing gear bay is lowered. Note that operation oil discharged from the bore oil chamber 24 while the gear actuator 21 is being retracted returns to the first port of the hydraulic pump 53 through the orifice 45 and the return valve 55, and returns to the reservoir 81 through the filter 82. The orifice 45 throttles the flow of operation oil to control the speed of retraction of the gear actuator 21. Thus, the speed of lowering of the landing gear is controlled. Note that the down-lock release actuator 23 is extended by a load of a biasing member.

After lowering of the landing gear, the controller 9 switches, referring to FIG. 18, the gear selector valve 61 to the offset position, and switches the door selector valve 62 to the normal position. Thus, the door actuator 22 is retracted to close the door as described above. After completion of a sequence of operation of extending the landing gear, the controller 9 switches, in order to return to the state illustrated in FIG. 11, each of the gear selector valve 61 and the dump valve 43 to the normal position, and stops the electric motors 54 of the first and second hydraulic supply sources 51, 52. This switches each return valve 55 to the center position.

As described above, in the EHA system 10 illustrated in FIG. 11, the first and second hydraulic supply sources 51, 52 capable of supplying operation oil to each hydraulic actuator 2 are provided in parallel to each other. Thus, as well as ensuring redundancy of the hydraulic supply source, the size and weight of the EHA system 10 can be reduced.

In a normal state of the hydraulic supply source, both of the first and second hydraulic supply sources 51, 52 sequentially supply operation oil to the hydraulic actuators 2 in the EHA system 10. On the other hand, when one of the hydraulic supply sources is failed, the other hydraulic supply source sequentially supplies operation oil to the hydraulic actuators 2. Thus, the supply capacity of each of the first and second hydraulic supply sources 51, 52 can be, as described above, arbitrarily set to further reduce the size and weight of the EHA system 10 and to reduce performance degradation in the failure state.

Third Embodiment

Figure 19:
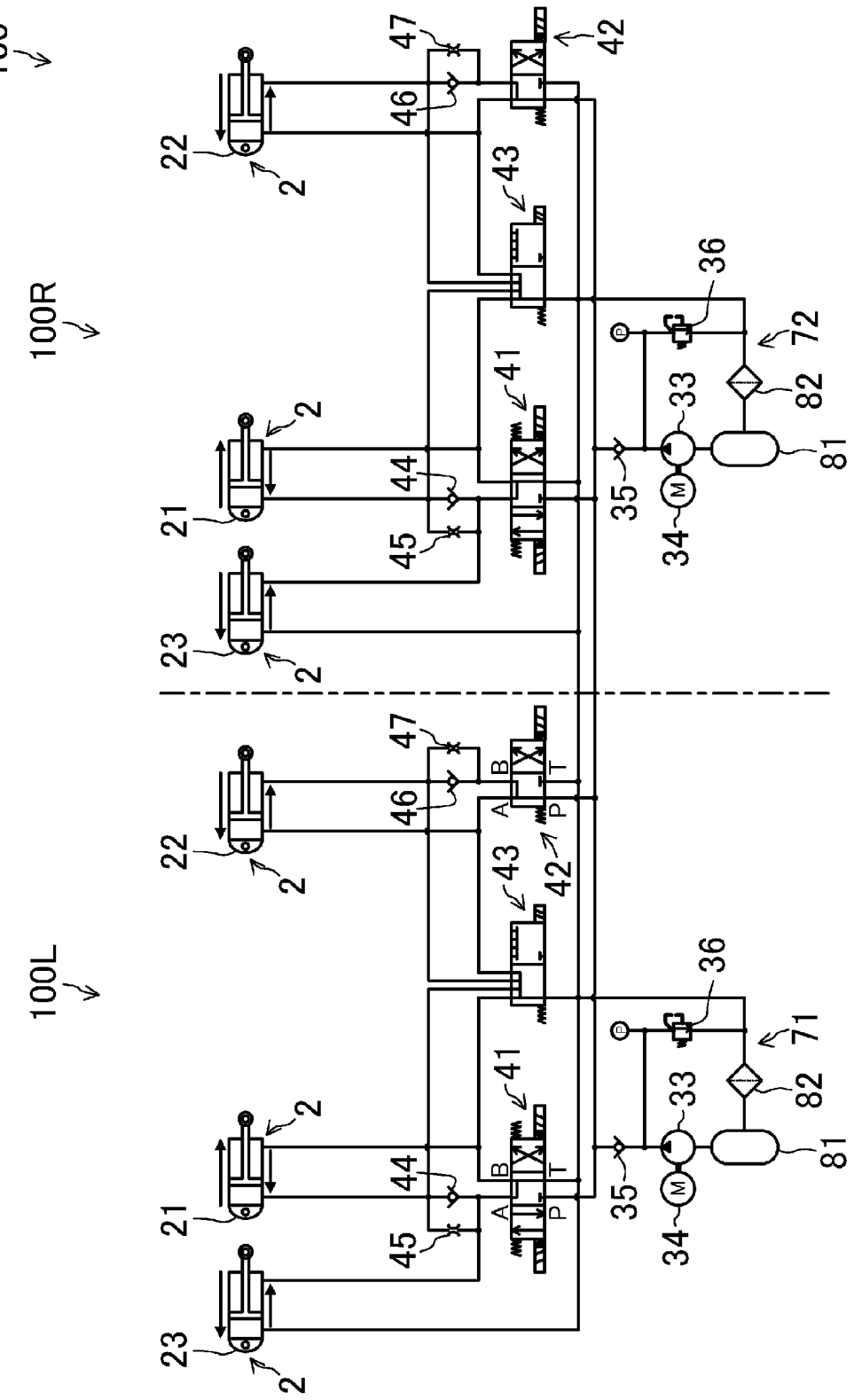
FIG. 19 is a circuit diagram of a landing gear retraction/extension EHA system of a third embodiment.

FIG. 19 is a circuit diagram of an EHA system 100 of a third embodiment. Although the EHA system 1 illustrated in FIG. 2 or the EHA system 10 illustrated in FIG. 11 is a system for a mechanism for retracting/extending a landing gear only on a starboard side or a port side of an aircraft, the EHA system 100 illustrated in FIG. 19 is a combined system of an EHA system 100R for a retraction/extension mechanism on the starboard side and an EHA system 100L for a retraction/extension mechanism on the port side. Since the configurations on the starboard side and the port side in the EHA system 100 are basically the same as each other, the configuration of the system on the port side will be mainly described below. Note that the same reference numerals as those shown in the EHA system 1 illustrated in FIG. 2 are used to represent equivalent elements in the EHA system 100, and the description thereof will not be repeated.

The port-side EHA system 100L includes a gear actuator 21, a door actuator 22, and a down-lock release actuator 23. Since configurations of such actuators 2 are the same as those of the EHA system 1 illustrated in FIG. 2, the description thereof will not be repeated.

A gear selector valve 41, a door selector valve 42, and a dump valve 43 have the same configurations as those of the gear selector valve 41, the door selector valve 42, and the dump valve 43 of the EHA system 1 illustrated in FIG. 2. That is, the gear selector valve 41 is a four-port three-position switching valve formed with four ports, i.e., a P port, a T port, an A port, and a B port, and is also a hydraulic pilot type solenoid valve in which a spool is biased to a center position by a spring. Moreover, the door selector valve 42 is a four-port two-position switching valve formed with four ports, i.e., a P port, a T port, an A port, and a B port, and is also a hydraulic pilot type solenoid valve in which a spool is biased to a normal position by a spring. Further, the dump valve 43 is a five-port two-position switching valve formed with A-D ports and a T port, and is also a direct-drive solenoid valve in which a spool is biased to a normal position by a spring.

The port-side EHA system 100L includes a single hydraulic supply source 71 with a single hydraulic pump 33 and a single electric motor 34. The starboard-side EHA system 100R also includes a single hydraulic supply source 72 with a single hydraulic pump 33 and a single electric motor 34.

The hydraulic pump 33 of the hydraulic supply source 71, 72 is a one-direction rotary pump. An inlet port of the hydraulic pump 33 is connected to a reservoir 81, and an outlet port of the hydraulic pump 33 is connected to the P port of the gear selector valve 41 and the P port of the door selector valve 42 through a check valve 35 configured to prevent a backflow in a failure state.

The outlet port of the hydraulic pump 33 of the port-side EHA system 100L is connected to the P ports of the gear selector valve 41 and the door selector valve 42 of the starboard-side EHA system 100R. On the other hand, the outlet port of the hydraulic pump 33 of the starboard-side EHA system 100R is connected to the P ports of the gear selector valve 41 and the door selector valve 42 of the port-side EHA system 100L.

In the EHA system 100 illustrated in FIG. 19, steps of operation of retracting the landing gear are performed according to the steps illustrated in FIGS. 2-6, and steps of operation of extending the landing gear are performed according to the steps illustrated in FIGS. 6-9 and 2. Thus, the description of such steps will not be repeated.

In the EHA system 100 illustrated in FIG. 19, the hydraulic supply source 71 of the port-side EHA system 100L and the hydraulic supply source 72 of the starboard-side EHA system 100R are provided in parallel to each other on a circuit. Any of the hydraulic supply sources 71, 72 is capable of supplying operation oil to each hydraulic actuator 2 of the port-side EHA system 100L and the starboard-side EHA system 100R. Thus, the hydraulic supply source 71 of the port-side EHA system 100L and the hydraulic supply source 72 of the starboard-side EHA system 100R ensure redundancy of the hydraulic supply source. That is, when both of the hydraulic supply sources 71, 72 of the port-side EHA system 100L and the starboard-side EHA system 100R are in a normal state, the hydraulic supply sources 71, 72 sequentially supply operation oil to each hydraulic actuator 2 of the port-side EHA system 100L and the starboard-side EHA system 100R. On the other hand, when one of the hydraulic supply sources 71, 72 is failed, the other one of the hydraulic supply sources 71, 72 sequentially supplies operation oil to each hydraulic actuator 2 of the port-side EHA system 100L and the starboard-side EHA system 100R. As described above, the combined EHA system 100 of the EHA system 100L for the mechanism for retracting/extending the landing gear on the port side and the EHA system 100R for the mechanism for retracting/extending the landing gear on the starboard side is advantageous to further reduction in size and weight.

Note that, in the EHA system 100 illustrated in FIG. 19, the hydraulic supply sources 71, 72 are not necessarily arranged respectively on the port and starboard sides in an aircraft body. Although not shown in the figure, the hydraulic supply sources 71, 72 may be arranged at the center of the aircraft body to supply operation oil to the port-side retraction/extension mechanism and the starboard-side retraction/extension mechanism. In such a case, the reservoir 81 may be shared by the port-side retraction/extension mechanism and the starboard-side retraction/extension mechanism.

Fourth Embodiment

Figure 20:
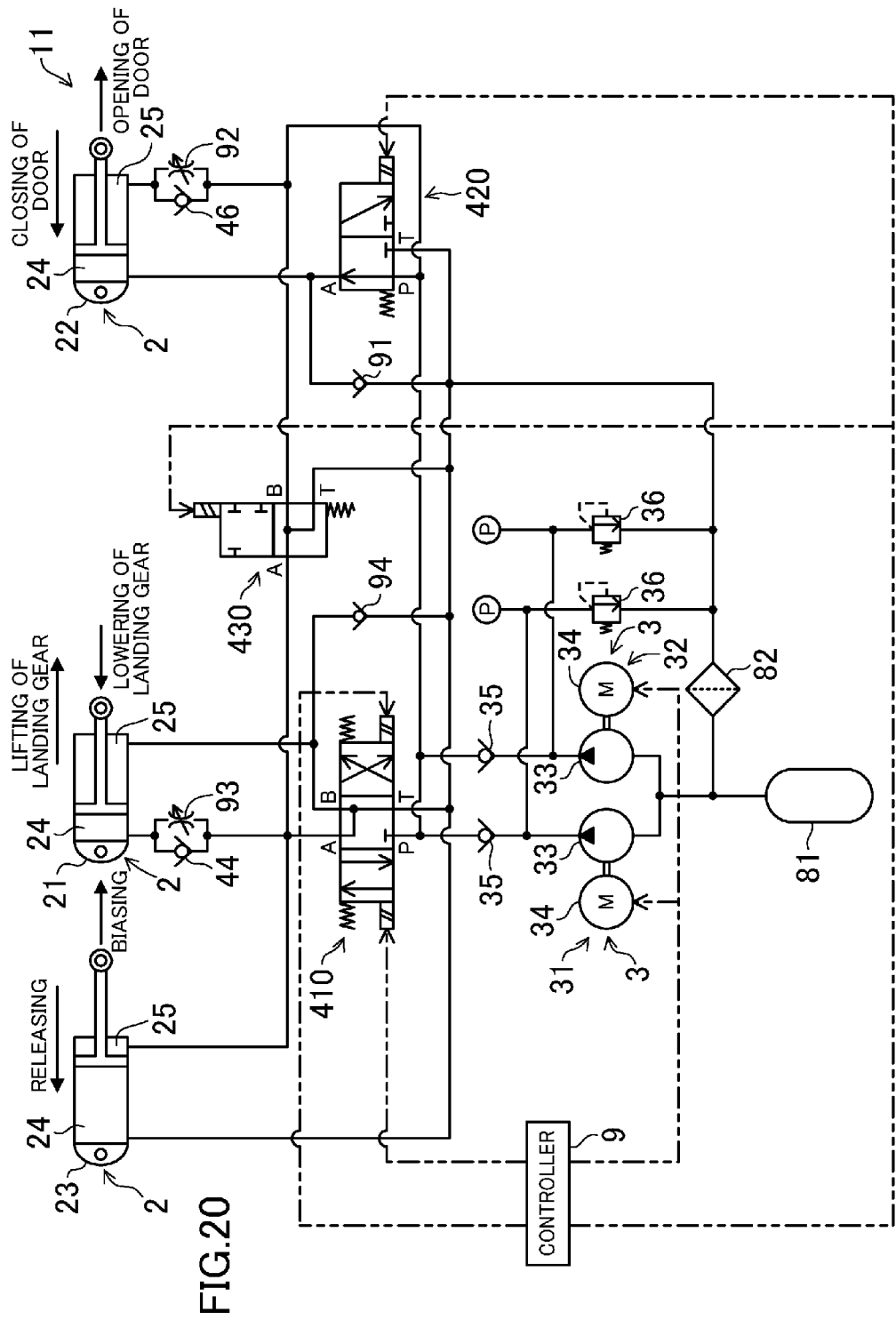
FIG. 20 is a circuit diagram of a landing gear retraction/extension EHA system of a fourth embodiment illustrating a landing gear down state (i.e., a landing-gear-lowered and door-closed state).

FIG. 20 is a circuit diagram of an EHA system 11 of a fourth embodiment. The EHA system 11 is a system formed in such a manner that modification such as simplification of various valves is performed for the EHA system 1 illustrated in FIG. 2. Note that the same reference numerals as those shown in the EHA system 1 illustrated in FIG. 2 are used to represent equivalent elements in the EHA system 11 illustrated in FIG. 20, and the description thereof will not be repeated. Changes of a configuration of the EHA system 11 of the fourth embodiment from the EHA system 1 illustrated in FIG. 2 will be mainly described.

The dump valve 43 illustrated in FIG. 2 is the five-port two-position switching valve. On the other hand, a dump valve 430 illustrated in FIG. 20 is a three-port two-position switching valve formed with three ports, i.e., an A port, a B port, and a T port. At a normal position, the dump valve 430 allows each of the A and B ports to communicate with the T port. At an offset position, the dump valve 430 blocks each of the A, B, and T ports. The A port of the dump valve 430 is connected to a bore oil chamber 24 of a gear actuator 21 and an annulus oil chamber 25 of a down-lock release actuator 23, and the B port of the dump valve 430 is connected to an annulus oil chamber 25 of a door actuator 22. The T port of the dump valve 430 is connected to a reservoir 81.

The door selector valve 42 illustrated in FIG. 2 is a spool and sleeve valve, and the spool is driven by pilot hydraulic pressure. On the other hand, a door selector valve 420 illustrated in FIG. 20 is the same spool and sleeve valve as the door selector valve 42, but a solenoid receives a drive signal from a controller 9 to directly drive a spool. Although will be described later, the EHA system 1, 11 may control, in operation of each actuator 21, 22, the rotational speed of an electric motor 34 to adjust the rotational speed of a hydraulic pump 33, thereby adjusting the speed of operation of each actuator 21, 22. Since the pilot hydraulic pressure of the pilot-operated hydraulic spool valve decreases with lowering the rotational speed of the hydraulic pump 33, there is a possibility that valve operation becomes instable. The direct-drive door selector valve 420 using the solenoid is stably operated regardless of the rotational speed of the hydraulic pump 33.

The door selector valve 42 illustrated in FIG. 2 is the four-port two-position switching valve. On the other hand, the door selector valve 420 illustrated in FIG. 20 is a three-port two-position switching valve formed with three ports, i.e., an A port, a P port, and a T port. At a normal position, the door selector valve 420 allows the A and P ports to communicate with each other. At an offset position, the door selector valve 420 allows the A and T ports to communicate with each other. The A port of the door selector valve 420 is connected to a bore oil chamber 24 of the door actuator 22. The P port of the door selector valve 420 is connected to each of outlet ports of the hydraulic pumps 33 of first and second hydraulic supply sources 31, 32, and the T port of the door selector valve 420 is connected to the reservoir 81.

The bore oil chamber 24 of the door actuator 22 is also connected to the reservoir 81 so as to bypass the door selector valve 420, and a check valve 91 is interposed in the middle of the bypass path. The check valve 91 is a valve configured to prevent the inner pressure of the bore oil chamber 24 of the door actuator 22 from being negative pressure. Functions of the check valve 91 will be described in detail later.

As described above, the annulus oil chamber 25 of the door actuator 22 is connected to the B port of the dump valve 430, and is also connected to each of the outlet ports of the hydraulic pumps 33 of the first and second hydraulic supply sources 31, 32 so as to bypass the door selector valve 420. A check valve 46 and a variable restrictor 92 are interposed in parallel to each other on the hydraulic path communicating with the annulus oil chamber 25 of the door actuator 22. The variable restrictor 92 is configured to change a restricted amount depending on the stroke of the door actuator 22. The variable restrictor 92 controls the speed of extension of the door actuator 22, and narrows a restrictor opening right before the door actuator 22 is completely extended. This further reduces the speed of extension of the door actuator 22.

A gear selector valve 410 illustrated in FIG. 20 is the same four-port three-position switching valve as the gear selector valve 41 illustrated in FIG. 2. Note that the gear selector valve 410 is a direct-drive spool and sleeve valve using a solenoid as in the door selector valve 420 and the dump valve 430. An A port of the gear selector valve 410 is connected to the bore oil chamber 24 of the gear actuator 21 through a check valve 44 and a variable restrictor 93, and is connected to the annulus oil chamber 25 of the down-lock release actuator 23. The variable restrictor 93 is, as in the variable restrictor 92, configured to control the speed of retraction of the gear actuator 21 and to narrow a restrictor opening right before the gear actuator 21 is completely retracted. This further reduces the speed of retraction of the gear actuator 21.

A B port of the gear selector valve 410 is connected to an annulus oil chamber 25 of the gear actuator 21. The annulus oil chamber 25 of the gear actuator 21 is also connected to the reservoir 81 so as to bypass the gear selector valve 410. A check valve 94 is interposed on such a bypass path. The check valve 94 is configured to prevent the inner pressure of the annulus oil chamber 25 of the gear actuator 21 from being negative pressure.

Figure 21:
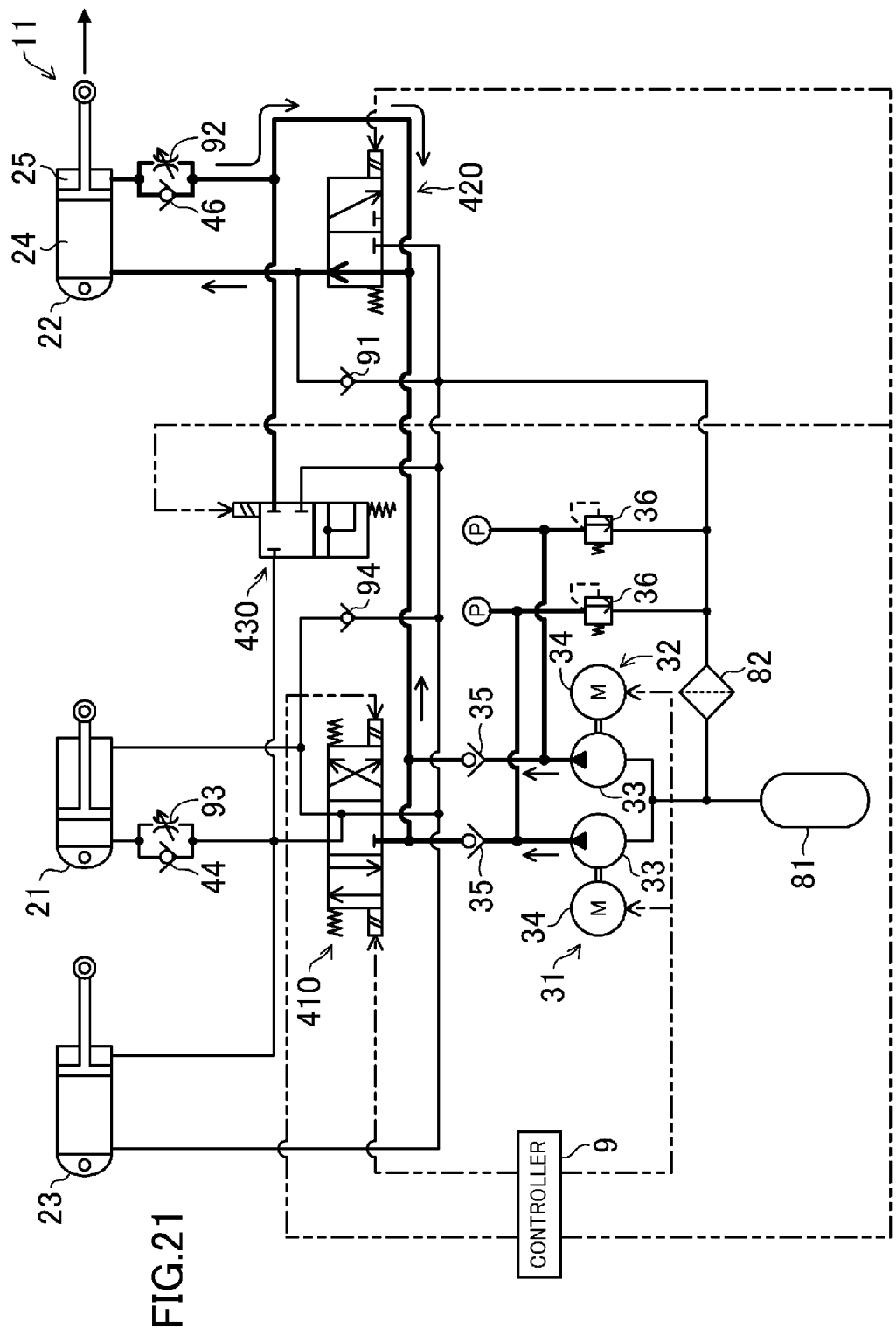
FIG. 21 is a diagram illustrating, upon retraction of a landing gear, an EHA system operation from the landing-gear-lowered and door-closed state to a door-opened state.
Figure 22:
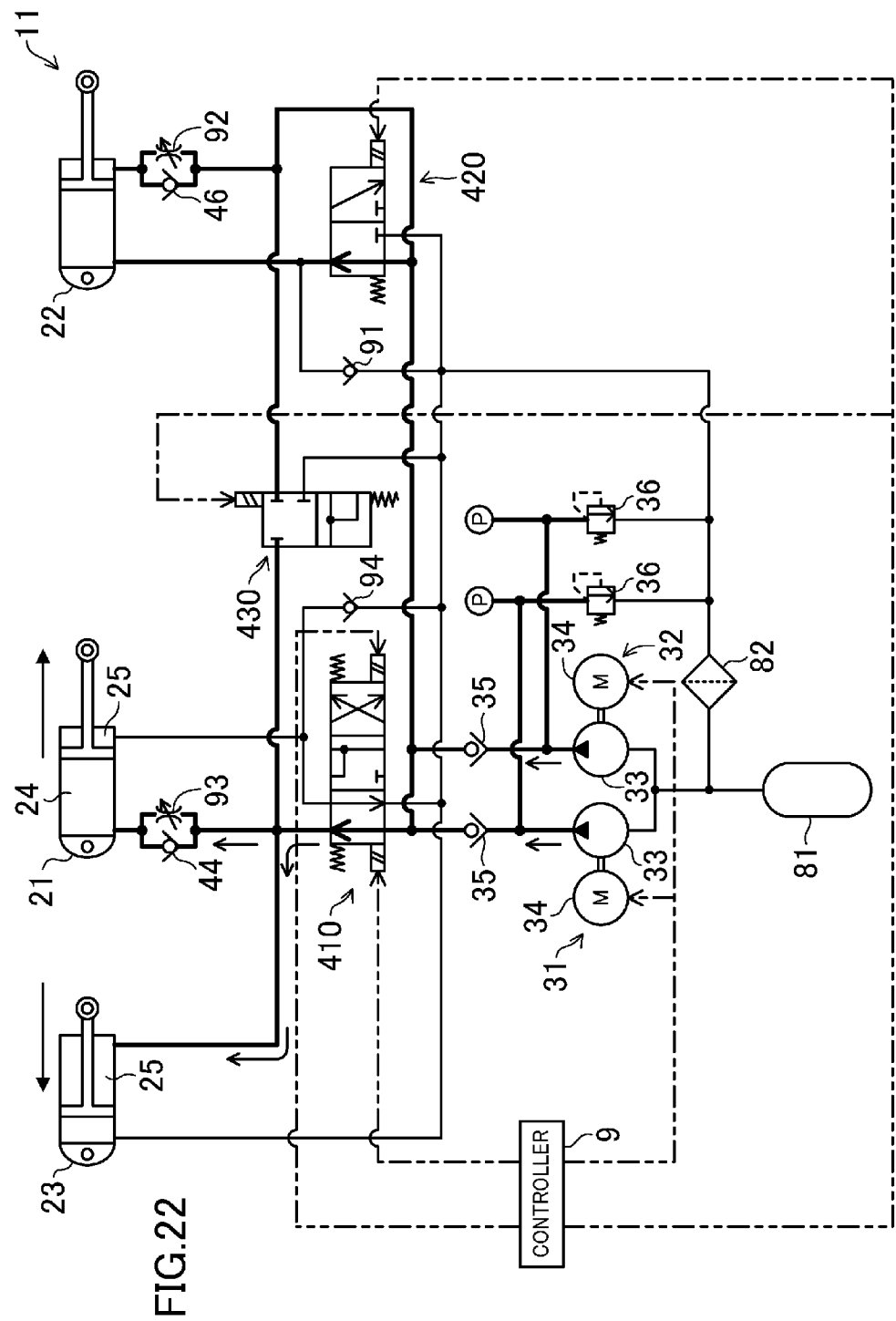
FIG. 22 is a diagram illustrating, upon the retraction of the landing gear, an EHA system operation from the landing-gear-lowered and door-opened state to a landing-gear-lifted state.
Figure 23:
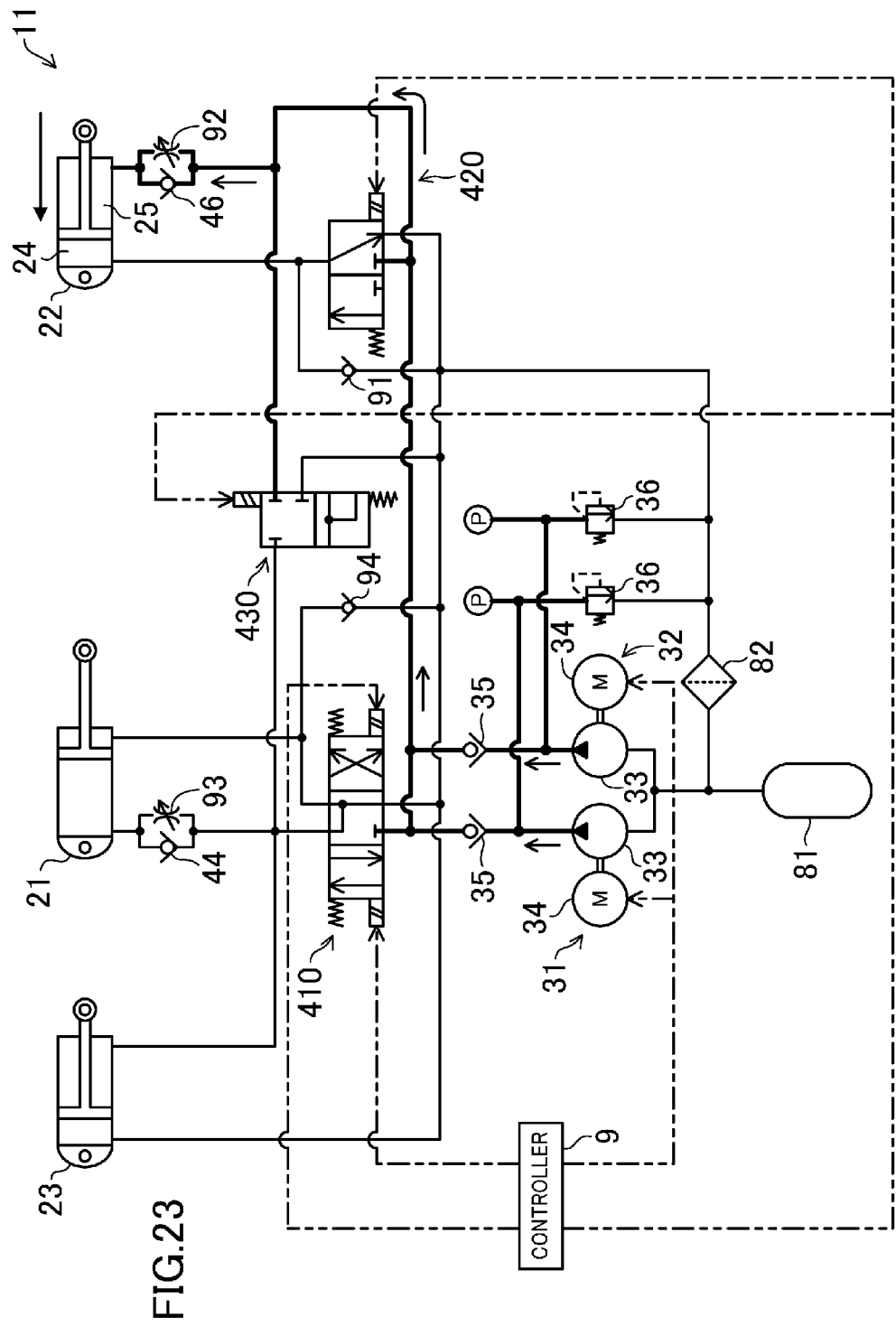
FIG. 23 is a diagram illustrating, upon the retraction of the landing gear, an EHA system operation from the landing-gear-lifted and door-opened state to a door-closed state.
Figure 24:
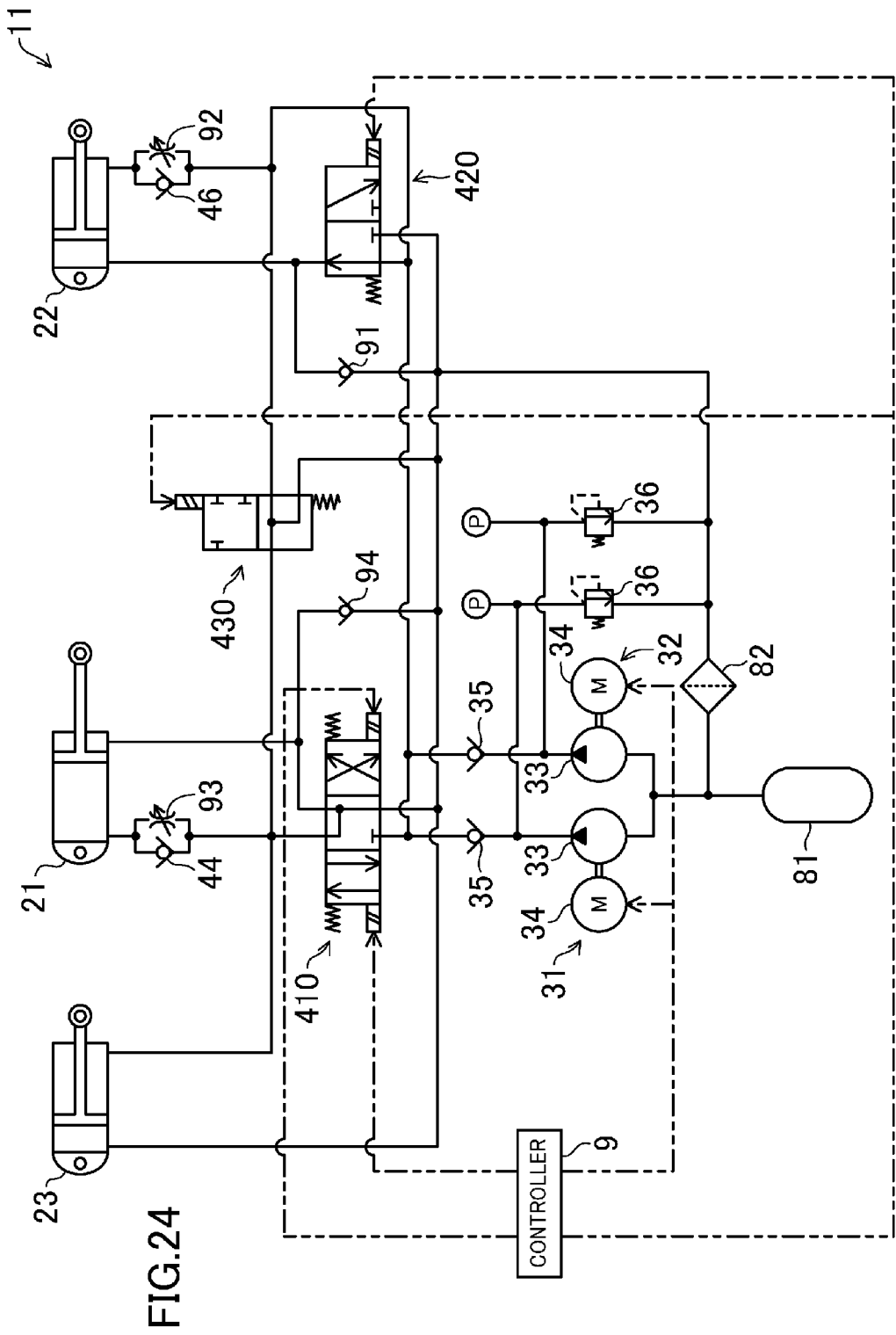
FIG. 24 is a circuit diagram of a landing gear retraction/extension EHA system in a landing gear up state (i.e., a landing-gear-lifted and door-closed state).

Next, steps of operation of the EHA system 11 having the foregoing configuration will be described. FIGS. 20-24 illustrate the operation of retracting a landing gear. FIG. 20 corresponds to a landing-gear-lowered and door-closed state. FIG. 21 corresponds to the operation of opening a door. FIG. 22 corresponds to the operation of lifting the landing gear. FIG. 23 corresponds to the operation of closing the door. FIG. 24 corresponds to a landing-gear-lifted and door-closed state. In FIGS. 21-23, a path through which operation oil is supplied is indicated by a thick solid line, and a path connected to the reservoir 81 is indicated by a solid line.

At the beginning of retraction of the landing gear, the EHA system 11 is in the state illustrated in FIG. 20. The gear selector valve 410 is at a center position, and the door selector valve 420 and the dump valve 430 are at the normal position. Starting from such a state, the controller 9 switches, referring to FIG. 21, the dump valve 430 to the offset position, thereby blocking all of the A, B, and T ports of the dump valve 430.

The controller 9 drives the electric motors 34 of the first and second hydraulic supply sources 31, 32. Referring to FIG. 21, operation oil flows into the bore oil chamber 24 of the door actuator 22, and the door actuator 22 is extended (see an arrow illustrated in FIG. 21). Operation oil discharged from the annulus oil chamber 25 while the door actuator 22 is being extended also flows into the bore oil chamber 24 of the door actuator 22 through the variable restrictor 92 and the door selector valve 420. The door actuator 22 is extended to open the door of a landing gear bay. The controller 9 lowers the rotational speed of the hydraulic pump 33 right before the door actuator 22 is completely extended, thereby reducing the amount of operation oil supplied to the door actuator 22. A control of the rotational speed of the hydraulic pump 33 and adjustment of the restricted amount of the variable restrictor 92 mitigate an impact upon completion of opening of the door.

After the door of the landing gear bay is opened, the controller 9 switches, referring to FIG. 22, the gear selector valve 410 to a first offset position. This allows the A port and a P port of the gear selector valve 410 to communicate with each other, and allows the B port and a T port of the gear selector valve 410 to communicate with each other. As indicated by arrows, the first and second hydraulic supply sources 31, 32 supply operation oil to the annulus oil chamber 25 of the down-lock release actuator 23 through the gear selector valve 410. The down-lock release actuator 23 is retracted as indicated by an arrow illustrated in FIG. 22 to release a mechanism for maintaining a landing gear down state. Moreover, the first and second hydraulic supply sources 31, 32 supply operation oil to the bore oil chamber 24 of the gear actuator 21 through the check valve 44. The gear actuator 21 is extended as indicated by an arrow illustrated in FIG. 22 to lift the landing gear which is not shown in the figure. The controller 9 lowers the rotational speed of the hydraulic pump 33 right before the gear actuator 21 is completely extended, thereby reducing the amount of operation oil supplied to the gear actuator 21. This mitigates an impact upon completion of lifting of the landing gear. Note that operation oil discharged from the annulus oil chamber 25 while the gear actuator 21 is being extended returns to the reservoir 81 through the gear selector valve 410 and a filter 82.

After the landing gear is stored in the landing gear bay, the controller 9 switches, referring to FIG. 23, the gear selector valve 410 to the center position, and switches the door selector valve 420 to the offset position. The first and second hydraulic supply sources 31, 32 supply operation oil to the annulus oil chamber 25 of the door actuator 22 through the check valve 46. The door actuator 22 is retracted as indicated by an arrow illustrated in FIG. 23. Operation oil discharged from the bore oil chamber 24 while the door actuator 22 is being retracted returns to the reservoir 81 through the door selector valve 420 and the filter 82. The controller 9 lowers the rotational speed of the hydraulic pump 33 right before the door actuator 22 is completely refracted, thereby reducing the amount of operation oil supplied to the door actuator 22. Thus, the door is closed while an impact is mitigated. After completion of retraction of the landing gear, the controller 9 switches, in order to maintain the state illustrated in FIG. 24, i.e., the landing-gear-lifted and door-closed state, the door selector valve 420 to the normal position, and stops the electric motors 34 of the first and second hydraulic supply sources 31, 32. Moreover, the controller 9 switches the dump valve 430 to the normal position.

Figure 25:
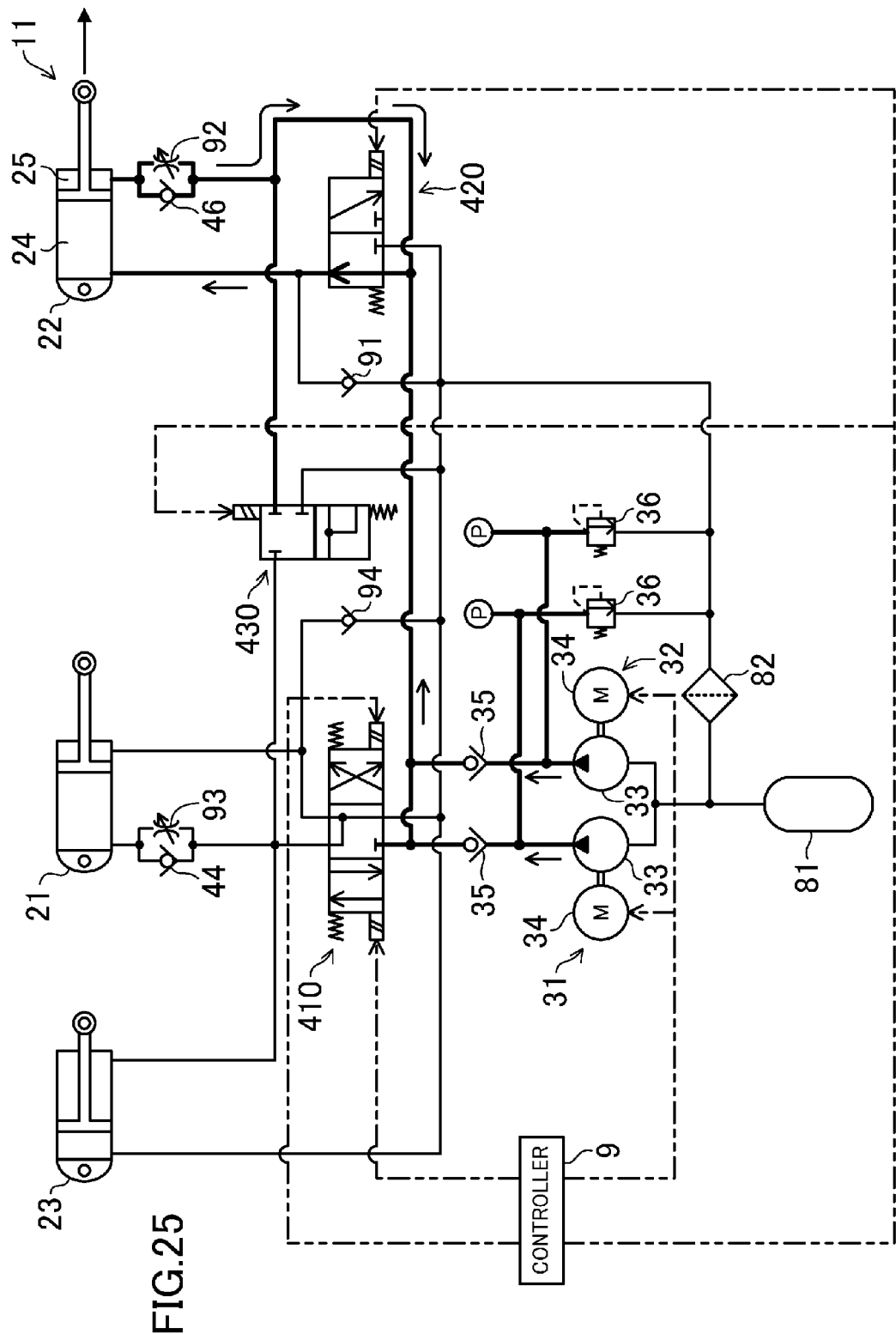
FIG. 25 is a diagram illustrating, upon extension of a landing gear, an EHA system operation from the landing-gear-lifted and door-closed state to a door-opened state.

Next, steps of operation of the EHA system 11 for extending the landing gear will be described with reference to FIGS. 24-27 and 20. In FIGS. 24-27, the path through which operation oil is supplied is indicated by a thick solid line, and the path connected to the reservoir 81 is indicated by a solid line. FIG. 24 illustrates the landing-gear-lifted and door-closed state. FIG. 25 illustrates the operation of opening the door.

Figure 26:
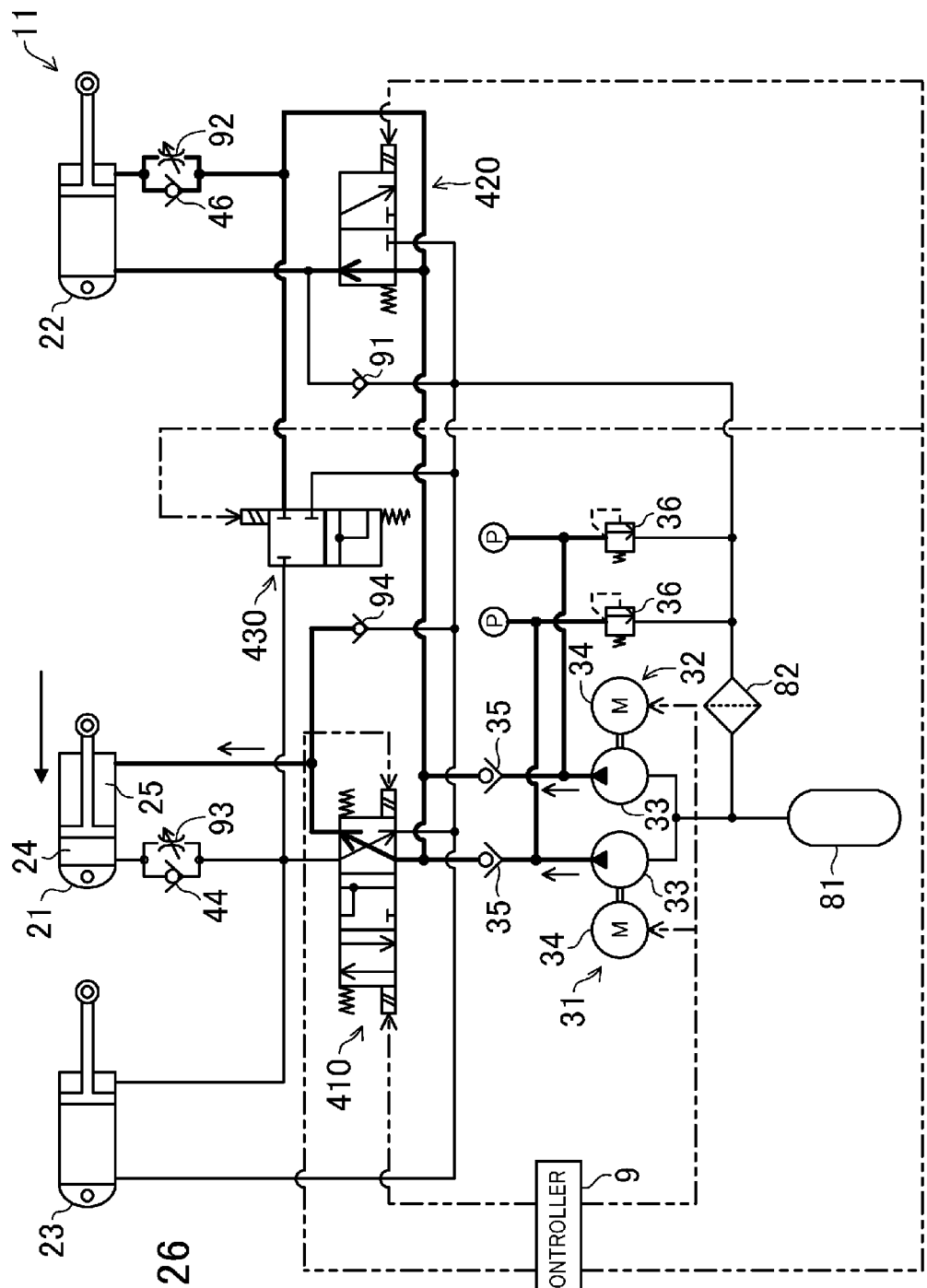
FIG. 26 is a diagram illustrating, upon the extension of the landing gear, an EHA system operation from the landing-gear-lifted and door-opened state to a landing-gear-lowered state.
Figure 27:
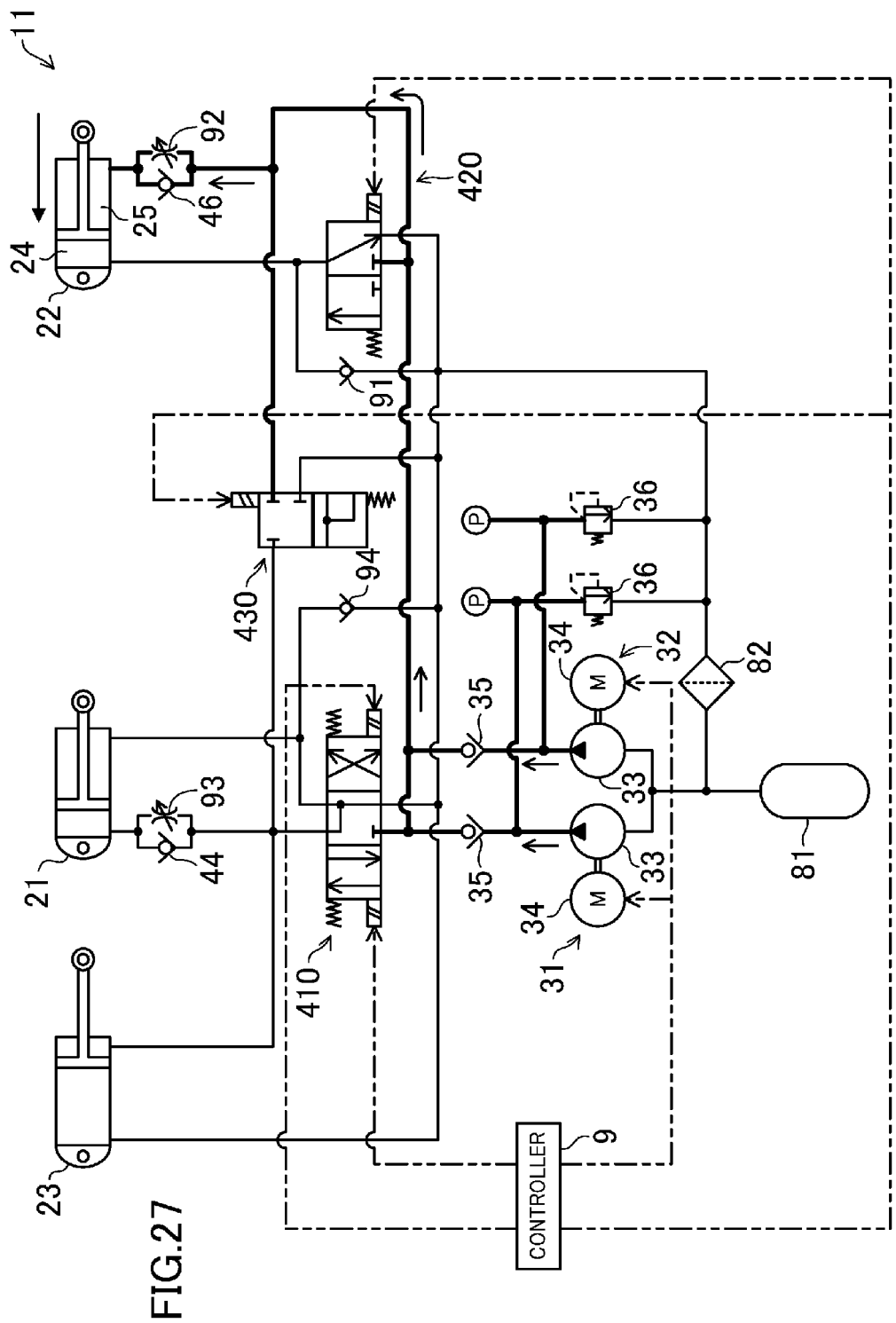
FIG. 27 is a diagram illustrating, upon the extension of the landing gear, an EHA system operation from the landing-gear-lowered and door-opened state to a door-closed state.

FIG. 26 illustrates the operation of lowering the landing gear. FIG. 27 illustrates the operation of closing the door.

The same process is performed from the beginning of extension of the landing gear as illustrated in FIG. 24 to the operation of opening the door (FIG. 25). Referring to FIG. 25, the door actuator 22 is extended to open the door of the landing gear bay.

Subsequently, the controller 9 switches, referring to FIG. 26, the gear selector valve 410 to a second offset position. The B and P ports of the gear selector valve 410 communicate with each other. As indicated by arrows, the first and second hydraulic supply sources 31, 32 supply operation oil to the annulus oil chamber 25 of the gear actuator 21. The gear actuator 21 is retracted as indicated by an arrow illustrated in FIG. 26, and therefore the landing gear stored in the landing gear bay is lowered. Operation oil discharged from the bore oil chamber 24 while the gear actuator 21 is being retracted returns to the reservoir 81 through the variable restrictor 93 and the gear selector valve 410. The variable restrictor 93 throttles the flow of operation oil to control the speed of retraction of the gear actuator 21. Moreover, the variable restrictor 93 narrows the restrictor opening right before the gear actuator 21 is completely retracted, thereby further lowering the speed of retraction of the gear actuator 21. The controller 9 lowers the rotational speed of the hydraulic pump 33 right before the gear actuator 21 is completely retracted. This mitigates an impact upon completion of lowering of the landing gear. Note that the down-lock release actuator 23 is extended by a load of a biasing member.

After the gear actuator 21 is retracted to lower the landing gear, the controller 9 switches, referring to FIG. 27, the gear selector valve 410 to the center position, and switches the door selector valve 420 to the offset position. Thus, the door actuator 22 is, as described above, retracted to close the door (see an arrow illustrated in FIG. 27). After a sequence of operation of extending the landing gear is completed, the controller 9 switches, in order to maintain the state illustrated in FIG. 20, i.e., the landing-gear-lowered and door-closed state, the door selector valve 420 to the normal position, and stops the electric motors 34 of the first and second hydraulic supply sources 31, 32. Moreover, the controller 9 switches the dump valve 430 to the normal position.

Figure 28:
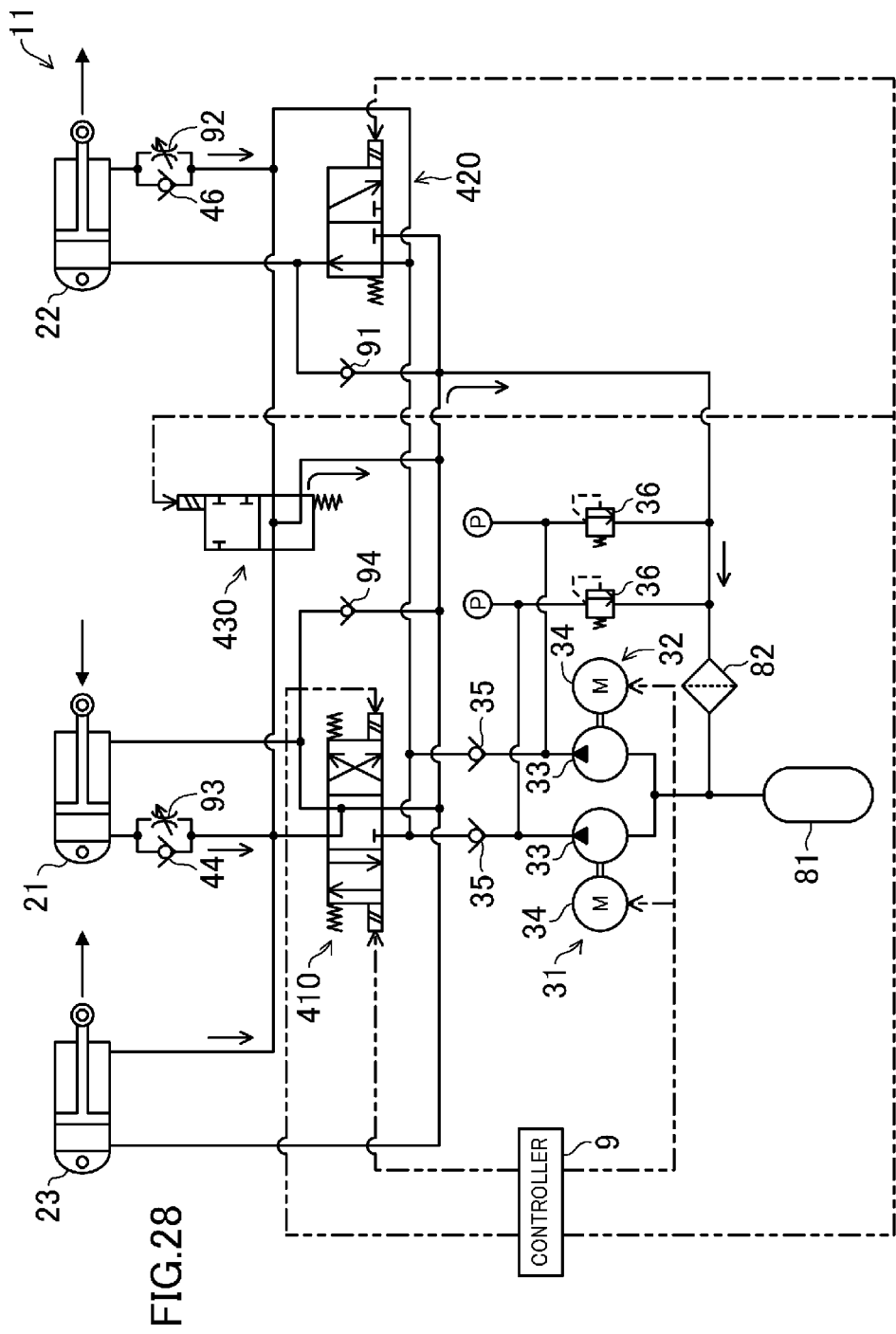
FIG. 28 is a circuit diagram illustrating the state of the landing gear retraction/extension EHA system upon emergency.

The EHA system 11 includes the first and second hydraulic supply sources 31, 32 provided in parallel to each other on a circuit. Thus, when one of the first and second hydraulic supply sources 31, 32 is failed, the other one of the first and second hydraulic supply sources 31, 32 is capable of supplying operation oil to each hydraulic actuator 2. On the other hand, FIG. 28 illustrates an emergency state such as the case where both of the first and second hydraulic supply sources 31, 32 are failed.

Upon emergency, the controller 9 switches the dump valve 430 to the offset position. The annulus oil chamber 25 of the door actuator 22 communicates with the reservoir 81 through the dump valve 430. The door opens under its own weight. The door selector valve 420 is maintained at, e.g., the normal position. The bore oil chamber 24 of the door actuator 22 communicates with the outlet port of the hydraulic pump 33 through the door selector valve 420. Since no operation oil is supplied from the hydraulic pump 33, there is a possibility that the bore oil chamber 24 of the door actuator 22 is under negative pressure in such a state (note that, although the bore oil chamber 24 of the door actuator 22 also communicates with the annulus oil chamber 25 of the door actuator 22 through the door selector valve 420, and operation oil is supplied from the annulus oil chamber 25 to the bore oil chamber 24, the amount of operation oil supplied to the bore oil chamber 24 is insufficient due to a cross-sectional area difference between the bore oil chamber 24 and the annulus oil chamber 25). However, the bore oil chamber 24 of the door actuator 22 communicates with the reservoir 81 so as to bypass the door selector valve 420. Thus, operation oil is supplied from the reservoir 81 pressurized at predetermined pressure to the bore oil chamber 24 of the door actuator 22 through the check valve 91. This prevents the bore oil chamber 24 from being under negative pressure. Note that, even if the door selector valve 420 is at the offset position, operation oil is supplied from the reservoir 81 to the bore oil chamber 24 of the door actuator 22.

The bore oil chamber 24 of the gear actuator 21 communicates with the A port of the dump valve 430 through the variable restrictor 93. Since the bore oil chamber 24 of the gear actuator 21 communicates with the reservoir 81, the landing gear is lowered under its own weight, and the gear actuator 21 is retracted (see an arrow illustrated in FIG. 28). The annulus oil chamber 25 of the gear actuator 21 communicates with the B port of the gear selector valve 410. Since no operation oil is supplied from the hydraulic pump 33 regardless of the position of the gear selector valve 410, there is a possibility that the annulus oil chamber 25 of the gear actuator 21 is under negative pressure in such a state. However, since the annulus oil chamber 25 of the gear actuator 21 communicates with the reservoir 81 so as to bypass the gear selector valve 410, operation oil is supplied from the reservoir 81 to the annulus oil chamber 25 of the gear actuator 21 through the check valve 94. This prevents the annulus oil chamber 25 from being under negative pressure. Note that the down-lock release actuator 23 is, at the annulus oil chamber 25 thereof, connected to the A port of the dump valve 430. As indicated by an arrow illustrated in FIG. 28, the down-lock release actuator 23 is extended by biasing force of a spring. As described above, a retraction/extension mechanism is in a landing-gear-lowered and door-opened state upon emergency.

(Options for EHA System)

Figure 29:
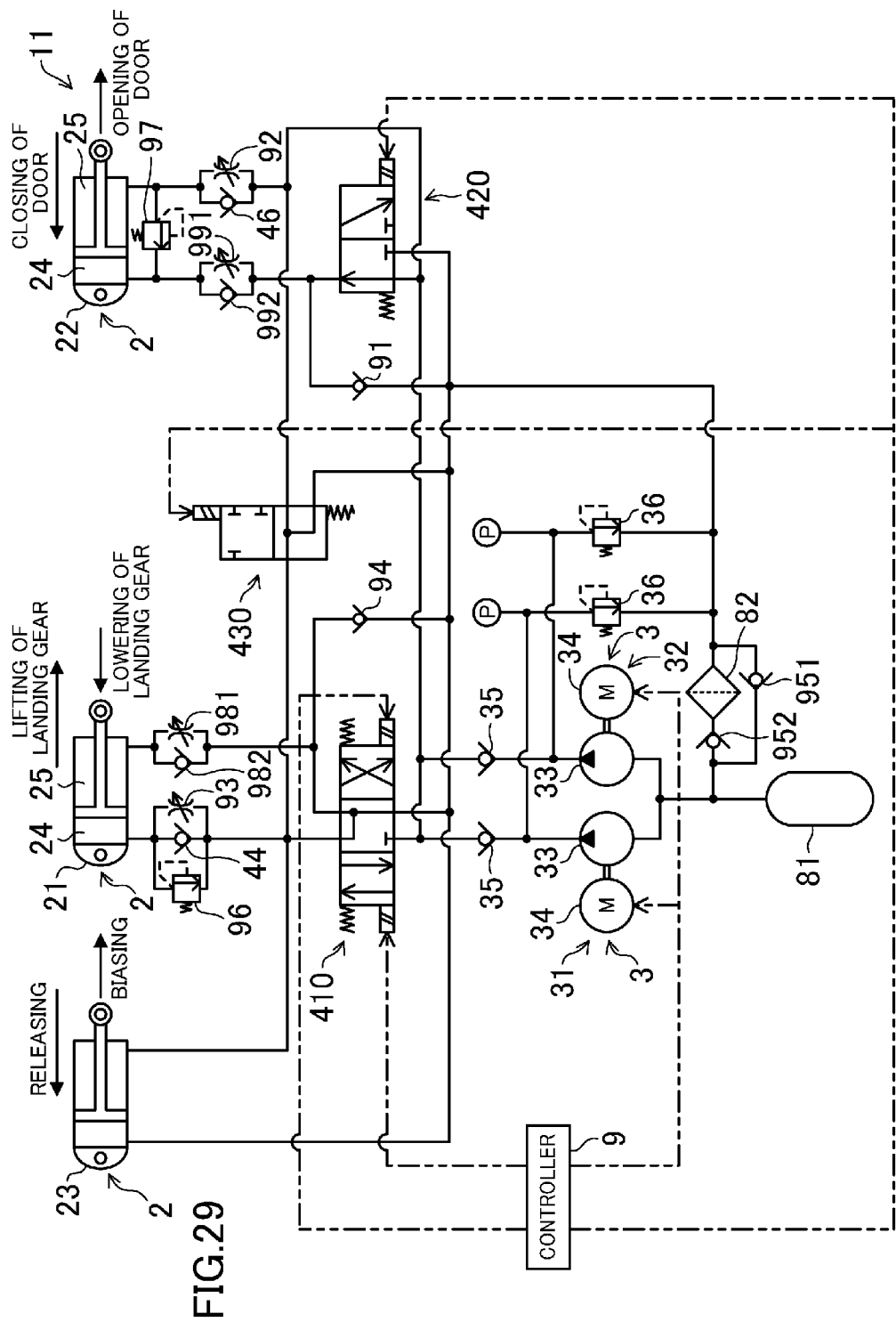
FIG. 29 is a diagram illustrating elements which can be arbitrarily added to a circuit of the landing gear retraction/extension EHA system.

FIG. 29 illustrates elements which can be arbitrarily added to the EHA system 11 illustrated in FIG. 20. A reference numeral "951" in FIG. 29 represents a check valve provided on a bypass path bypassing the filter 82, and a reference numeral "952" in FIG. 29 represents a check valve interposed between the filter 82 and the reservoir 81. The check valves 951, 952 prevent contamination trapped by the filter 82 from flowing back to the gear actuator 21 or the door actuator 22. That is, in the EHA system 11 illustrated in FIG. 20, operation oil may be, as described above, supplied from the reservoir 81 to each of the actuators 21, 22 upon emergency. In such a state, since a flow direction of operation oil is reversed, there is a possibility that contamination trapped by the filter 82 is removed together with operation oil and is supplied to the gear actuator 21 or the door actuator 22. The check valves 951, 952 are each configured to allow passage of operation oil through the filter 82 when the operation oil flows from each hydraulic actuator 2 to the reservoir 81 and to allow operation oil to bypass the filter 82 when the operation oil flows from the reservoir 81 to each hydraulic actuator 2. This prevents a backflow of contamination trapped by the filter 82.

A reference numeral "96" represents a relief valve provided on a path communicating with the bore oil chamber 24 of the gear actuator 21. The relief valve 96 is provided in parallel to the check valve 44 and the variable restrictor 93. The relief valve 96 prevents the gear actuator 21 from being over-pressurized. That is, in the EHA system 11, the rotational speed of the electric motor 34 is, as described above, controlled to adjust the rotational speed of the hydraulic pump 33 in operation of the actuator 21, 22. Meanwhile, a temperature environment under which the EHA system 11 is operated significantly changes with a significant change in temperature of operation oil. The change in temperature of operation oil results in a change in viscosity of the operation oil. Thus, even if the rotational speed of the hydraulic pump 33 is maintained constant, the discharge amount of the hydraulic pump 33 changes. As a result, the amount of operation oil supplied to the gear actuator 21 becomes excessively large, and therefore the gear actuator 21 may be over-pressurized. In the operation of lowering the landing gear, the relief valve 96 opens when the amount of operation oil supplied to the annulus oil chamber 25 of the gear actuator 21 becomes excessively large and the pressure of the bore oil chamber 24 reaches predetermined pressure, thereby reducing the pressure of the bore oil chamber 24. As described above, it is ensured that over-pressurization of the gear actuator 21 is prevented.

A reference numeral "97" is a relief valve configured to prevent the door actuator 22 from being over-pressurized. The relief valve 97 is provided on a path connecting between a path communicating with the bore oil chamber 24 of the door actuator 22 and the path communicating with the annulus oil chamber 25 of the door actuator 22. Note that the path on which the relief valve 97 is provided is connected between the annulus oil chamber 25 of the door actuator 22 and the variable restrictor 92. The relief valve 97 allows, in an open state thereof, operation oil to flow from the annulus oil chamber 25 of the door actuator 22 to the bore oil chamber 24 of the door actuator 22. That is, when the door actuator 22 is extended to open the door, operation oil is supplied from the hydraulic supply source 3 to the bore oil chamber 24 of the door actuator 22, and operation oil in the annulus oil chamber 25 is supplied to the bore oil chamber 24 of the door actuator 22 through the variable restrictor 92 and the door selector valve 420. When the door is opened, if the amount of operation oil supplied from the hydraulic pump 33 to the bore oil chamber 24 becomes excessively large and the pressure of the annulus oil chamber 25 reaches equal to or higher than predetermined pressure, the relief valve 97 opens. Thus, operation oil in the annulus oil chamber 25 flows into the bore oil chamber 24 through the relief valve 97. In other words, such operation oil flows into the bore oil chamber 24 so as to take a shortcut from the annulus oil chamber 25 to the bore oil chamber 24. This prevents the door actuator 22 from being over-pressurized.

Reference numerals "981" and "982" are a variable restrictor and a check valve interposed between the annulus oil chamber 25 of the gear actuator 21 and the gear selector valve 410, respectively. The variable restrictor 981 is configured to adjust the speed of lifting of the landing gear to facilitate a control of the electric motor 34. That is, the variable restrictor 981 is configured such that a restricted amount thereof changes depending on the stroke of the gear actuator 21. Specifically, a restrictor opening is narrowed right before the gear actuator 21 is completely extended. Thus, the amount of operation oil flowing into the bore oil chamber 24 of the gear actuator 21 is controlled, thereby lowering the speed of lifting of the landing gear. Depending on the stroke of the gear actuator 21, the rotational speed of the electric motor 34 is, as described above, controlled to lower the rotational speed of the hydraulic pump 33. Thus, the speed of lifting of the landing gear right before completion of lifting of the landing gear can be lowered. The variable restrictor 981 eliminate the need for controlling the rotational speed of the electric motor 34, or facilitates the control of the electric motor 34.

Reference numerals "991" and "992" are a variable restrictor and a check valve interposed between the bore oil chamber 24 of the door actuator 22 and the door selector valve 420, respectively. The variable restrictor 991 is configured to adjust the speed of closing of the door to facilitate the control of the electric motor 34. The variable restrictor 991 is configured such that a restricted amount thereof changes depending on the stroke of the door actuator 22. Specifically, a restrictor opening is narrowed right before the door actuator 22 is completely retracted. Thus, the amount of operation oil supplied to the annulus oil chamber 25 of the door actuator 22 is controlled, thereby lowering the speed of closing of the door.

The check valves 951, 952, the relief valves 96, 97, the variable restrictor 981, the check valve 982, the variable restrictor 991, and the check valve 992 are not essential elements of the EHA system 11, and are elements which can be arbitrarily added to the EHA system 11. One or more of such elements may be arbitrarily selected and added to the circuit of the EHA system 11. Moreover, each of the foregoing elements may be also added to the systems illustrated in FIGS. 2, 11, and 19 within an acceptable range.

The hydraulic circuits illustrated in FIGS. 2, 11, 19, and 20 have been set forth merely for the purpose of examples in nature, and any circuit configurations may be applicable to the circuit forming the EHA system of the landing gear retraction/extension mechanism. Moreover, such circuit configurations may be combined together within an acceptable range.

The number of hydraulic actuators provided in the EHA system is not limited to three. The EHA system may include two hydraulic actuators. Alternatively, the EHA system may include four or more hydraulic actuators. Moreover, the number of hydraulic supply sources provided in the EHA system may be three or more.

The present disclosure is not limited to the foregoing embodiments, and changes and modifications may be made to the embodiments without departing from the spirit and technical features of the present disclosure. The foregoing embodiments have been set forth merely for the purpose of examples in nature, and should not be interpreted as limiting the scope of the disclosure. The scope of the disclosure has been made as claimed, and is not bound in any way to the body of the specification. Moreover, other modifications and variations will, under the doctrine of equivalents, come within the scope of the disclosure.

What is claimed is:

1. An electro hydrostatic actuator system for retracting/extending a landing gear of an aircraft, comprising:
a plurality of hydraulic actuators configured to sequentially receive, for operation thereof, a supply of operation oil in retraction or extension of the landing gear;
a plurality of hydraulic supply sources provided in parallel to each other such that the operation oil is supplied to each hydraulic actuator and the plurality of hydraulic supply sources configured to be joined together;
a plurality of switching valves provided in parallel to each other on a supply path that connects the hydraulic actuators to a junction where the hydraulic supply sources are joined together and configured to selectively supply the operation oil to the hydraulic actuators; and
a controller configured to sequentially operate the hydraulic actuators by controlling the hydraulic supply sources and the switching valves,
wherein each hydraulic supply source includes
a single hydraulic pump configured to discharge the operation oil, and
a single electric motor configured to drive the hydraulic pump, the hydraulic supply sources together supply the operation oil sequentially to the hydraulic actuators in a normal state of the hydraulic supply sources, when at least one of the hydraulic supply sources is failed, at least one hydraulic supply source other than the failed one of the hydraulic supply sources supplies the operation oil sequentially to the hydraulic actuators, the hydraulic supply sources provided in parallel to each other each include a check valve arranged downstream of the hydraulic pump and upstream of the junction, and each check valve has no pilot lines and is configured to prevent the operation oil from flowing from the junction toward the hydraulic pump.

2. The electro hydrostatic actuator system of claim 1, wherein the hydraulic actuators are different from each other in operation oil supply conditions required for the operation of the hydraulic actuators, and an operation oil supply capacity of each hydraulic supply source required for sequentially operating the hydraulic actuators to retract or extend the landing gear is set based on the supply conditions, the operation oil supply capacity of each hydraulic supply source is set to be lower than the operation oil supply capacity required for sequentially operating the hydraulic actuators to retract or extend the landing gear, in the normal state of the hydraulic supply sources, the hydraulic pump of each hydraulic supply source is driven at a predetermined rotational speed to supply the operation oil sequentially to the hydraulic actuators, and when at least one of the hydraulic supply sources is failed, the hydraulic pump of at least one hydraulic supply source other than the failed one of the hydraulic supply sources is driven at a rotational speed higher than the predetermined rotational speed.

3. The electro hydrostatic actuator system of claim 2, wherein the hydraulic supply sources include first and second hydraulic supply sources, and the first and second hydraulic supply sources have an identical operation oil supply capacity.

4. The electro hydrostatic actuator system of claim 2, wherein the hydraulic actuators include:

a gear actuator for lifting and lowering the landing gear;

a door actuator for opening and closing a door of a landing gear bay in which the landing gear is stored; and a down-lock release actuator for releasing a mechanism for maintaining a landing gear down state, and the switching valves include:

a gear selector valve configured to selectively supply the operation oil to the gear actuator and the down-lock release actuator; and a door selector valve configured to selectively supply the operation oil to the door actuator.

5. The electro hydrostatic actuator system of claim 4, further comprising a dump valve provided in parallel to the gear selector valve and the door selector valve and arranged on an exhaust path that connects the gear actuator, the door actuator, and the down-lock release actuator to a reservoir.

6. The electro hydrostatic actuator system of claim 3, wherein if the required supply capacity is 100%, the supply capacity of the first and second hydraulic supply sources is each set to be equal to 50%.

* * * * *